United States Patent
Micaelian et al.

(10) Patent No.: US 8,620,800 B1
(45) Date of Patent: Dec. 31, 2013

(54) DETERMINING PATENT INFRINGEMENT RISK EXPOSURE USING LITIGATION ANALYSIS

(75) Inventors: Fadi Micaelian, Menlo Park, CA (US); Matt Huey, Santa Clara, CA (US); Richard Schank, Oakland, CA (US); Sanjay Prasad, Los Altos, CA (US); Gregory D. Gorder, Seattle, WA (US)

(73) Assignee: IVP Holdings III LLC, Bellevue, WA (US)

( * ) Notice: Subject to any disclaimer, the term of this patent is extended or adjusted under 35 U.S.C. 154(b) by 49 days.

(21) Appl. No.: 13/230,704

(22) Filed: Sep. 12, 2011

Related U.S. Application Data

(60) Provisional application No. 61/381,879, filed on Sep. 10, 2010.

(51) Int. Cl.
 *G06Q 40/00* (2012.01)

(52) U.S. Cl.
 USPC .............................. 705/38; 705/35

(58) Field of Classification Search
 USPC ...................................... 705/35–40
 See application file for complete search history.

(56) References Cited

U.S. PATENT DOCUMENTS 8,355,932 B2 * 1/2013 Malackowski et al. ........... 705/4

\* cited by examiner

*Primary Examiner* — Thu Thao Havan
(74) *Attorney, Agent, or Firm* — Lowe Graham Jones PLLC

(57) ABSTRACT

Methods, systems, and techniques for estimating patent infringement risk for a company using a statistical model of revenue are provided. Examples also provide a Patent Infringement Risk Assessment Tool, which uses these techniques to enable users to dynamically modify certain parameters and obtain a feel for their affect upon patent infringement risk exposure. Other examples describe the applicability of some of the methods and techniques for describing models of overall behavior when only the behavior of a segment at either the low end or high end (a tail) is known.

55 Claims, 16 Drawing Sheets

Payoff = $0.8S_R + .1J_R + .35LC_R$
$S_R$ Settlement Estimate
$J_R$ Judgment Estimate
$LC_R$ Litigation Cost Estimate
$p_i$ Branch probability Estimate

Fig. 13

DETERMINING PATENT INFRINGEMENT RISK EXPOSURE USING LITIGATION ANALYSIS

TECHNICAL FIELD

The present disclosure relates to methods, techniques, and systems for determining an entity's exposure to patent infringement risk and, in particular, to methods, techniques, and systems for determining an entity's exposure to patent infringement risk using statistical analyses of litigation outcomes.

BACKGROUND

While patent infringement is a familiar concern across the software industry, until now it has been difficult to reduce the complexities of litigation exposure down to an easily understandable set of figures. Some software companies now employ patent filing as a risk mitigation strategy and a few companies have also incorporated patent licensing into their core business strategy. While many of these inventions may not lend themselves to traditional commercial exploitation, some companies recognize that patents are assets in and of themselves. Other companies have a dramatically different patent position. For example, some companies have little to no patents. Although both types of companies are situated quite differently with regards to their IP portfolio, they both face similar threats from litigious patent holders looking to capitalize on the potential value of their assets.

Today, more patents are filed than ever before and predictably this has resulted in an increased frequency of patent litigation. Companies often are forced to recognize the dangers of an unanticipated law suit (or suits) from claimants ranging from well-known industry rivals to obscure holding companies potentially leading to millions of dollars in liability. While many companies may settle infringement actions rather than risk a large award from an unpredictable group of jurors or a judge, negotiated settlements frequently reach tens or even hundreds of millions of dollars. It is necessary then for companies to be able to anticipate and quantify their risk of infringement so they may plan for the worst while at the same time shoring up their asset portfolio to mitigate overall risk with respect to competitors. Risk mitigation is traditionally accomplished through in-licensing, patent acquisitions, or an increased effort to file patents concurrently or in anticipation of future product directions.

Currently, there are several ways to systematically assess a company's liability with respect to third-party patents. One such method finds that the strength of a patent (e.g., its potential for monetization through litigation) may be measured by a variety of characteristics, including the number of claims, the rate of forward citations, the number of prior art citations, and the number of continuations filed. A company may use these or other similar factors to determine the value of its portfolio as a whole by analyzing each patent in the portfolio. The resulting analysis can be compared to the portfolio analysis of other players in the industry to determine areas of relative strength and weakness. If a company's coverage is weak within an important area when compared to its competition, then it is likely more vulnerable to threats of patent infringement from its competition. Additionally, if a company's portfolio is concentrated in one key area, it may leave itself open to threats of litigation involving ancillary technologies that were not considered during strategic planning of the company's IP. In addition, certain patents within each technology area may be considered "key" patents in that they cover some essential feature that must be practiced by any company desiring to deploy that technology. Evaluating a company's portfolio this way may help determine areas of weakness, but offers little insight into the actual likelihood of litigation or the resulting damages and costs.

Other factors that may increase a company's exposure to patent litigation include growth rate and media coverage. A company that is experiencing a period of positive economic growth is generally more attractive as a litigation target due simply to positive media attention. Similarly, while a company whose innovations become topics of media interest may experience the positive effects of public adoration, or at least awareness, its technology becomes on the radar of litigious patent holders looking for an attractive defendant. Unfortunately, media coverage and public awareness are difficult to quantify and, by themselves, do not readily lend themselves to an infringement risk analysis.

BRIEF DESCRIPTION OF THE DRAWINGS

FIG. 13 illustrates an example interface to access the underlying data in an example analysis

DETAILED DESCRIPTION

Examples described herein provide methods, techniques, and systems for measuring an entity's exposure to patent infringement risk based upon statistical analyses of patent litigation outcomes expressed using revenue. Examples also provide a Patent Infringement Risk Assessment Tool ("PI-RAST"), which uses these techniques (the "PIRA" techniques, "PIRA" model, etc.) to enable users to dynamically modify certain parameters and obtain a feel for their affect upon patent infringement exposure. Other examples describe the applicability of some of the methods and techniques for describing models of overall behavior when only the behavior of a segment at either the low end or high end (a tail) is known. Such examples include applications to e-commerce, consumer products generally, marketing, and the like.

Rather than addressing the patent coverage of individual entities (companies or the like), the PIRA techniques provide a methodology of estimating risk, which considers an in-depth statistical analysis of patent litigation over a particular time period (e.g., the past 10 years). Although the size of a company's patent portfolio is an important factor in determining its vulnerability to claims of patent infringement, the size of the company itself is often more telling. The statistics of recent litigation back up this point. The larger the company, in general, the more likely it is to face threats of litigation. This is especially true in the case of patent infringement suits. Another key factor identified in calculating litigation risk is the recent litigation history of the company. If a company has faced several patent infringement suits in the recent past (e.g., over the past 30 months), it is likely that the company has been identified as especially vulnerable to law suits, and is therefore attractive to patent holders looking to assert their rights.

In the sections that follow, the methodology used to assess risk exposure by analyzing litigation outcome is described including a description of the sources of data. Next, the various equations for judgment cost, settlement cost, and litigation cost in terms of revenue are derived. Lastly, an example PIRAST (assessment tool) is illustrated. The section headers are included for reference and are not to be construed as limiting the examples or claims described herein.

Exposure Assessment Methodology

A. Estimating Litigation Outcomes

Figure 1:
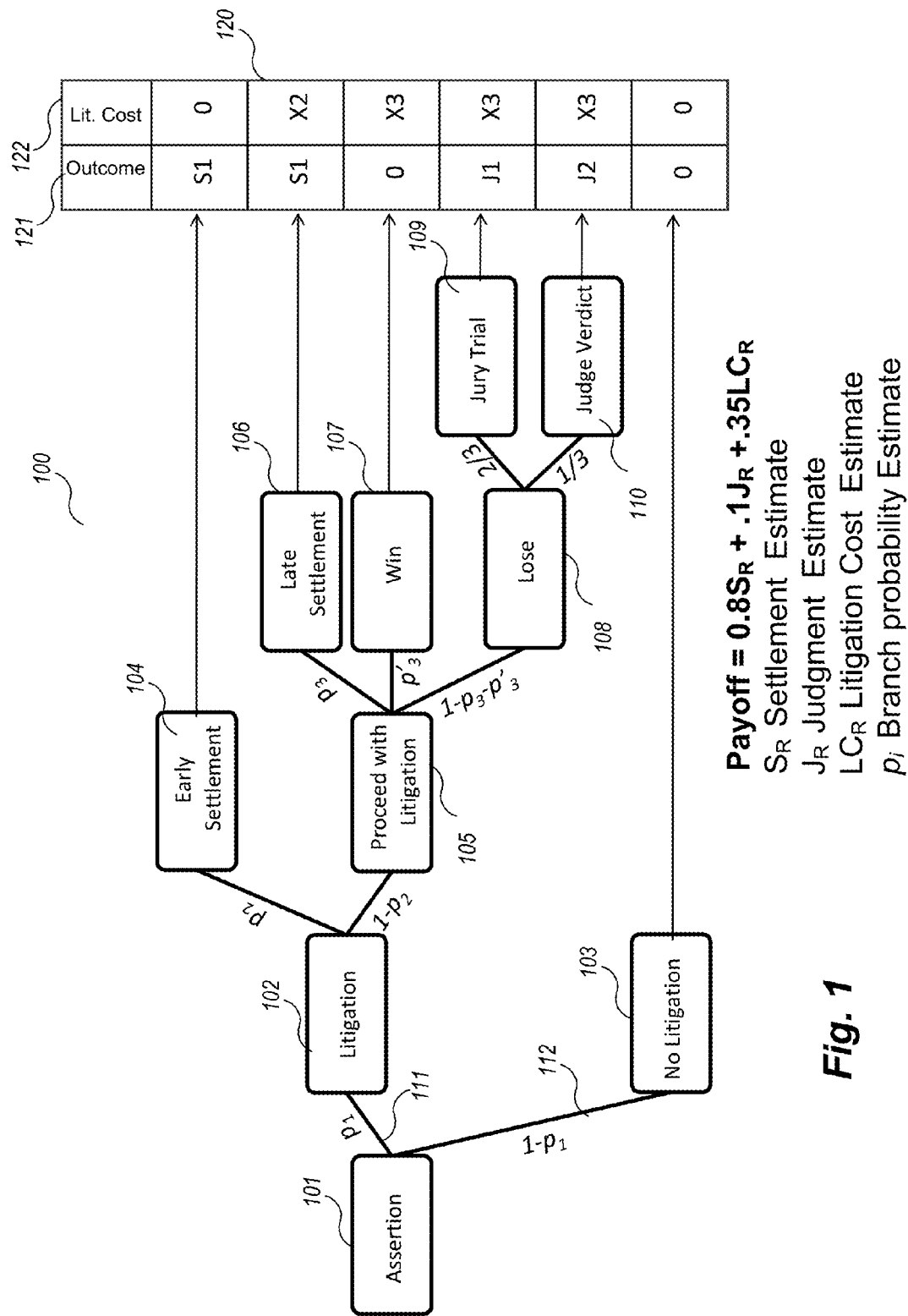
FIG. 1 is an example block diagram of a litigation tree showing possible outcomes and respective payoffs of a patent infringement litigation.

This section describes the techniques employed to estimate the exposure from litigation taking into account the probability of a patent infringement action, that is the likelihood that certain actions in a patent infringement lawsuit may occur. FIG. 1 is an example block diagram of a litigation tree showing possible outcomes and respective payoffs of a patent infringement litigation. The litigation tree 100 of FIG. 1 represents the general process and possible outcomes of a litigation starting at the time a company is put on notice and ending either with a settlement or a judgment/verdict, or the case being dropped. The litigation tree 100 consists of a set of nodes, e.g., nodes 101-110 which represent major events with different possible outcomes. Each node (e.g., nodes 101-110 is connected to one or more other nodes through different branches (e.g., paths 111 and 112) which have a probability of occurrence. Each branch of a node represents one of the possible outcomes. The "leaves" of the tree 100 are the end points of a branch where no additional event occurs (e.g., settlement 104 or 106).

Each branch/outcome has a certain probability of occurrence that is referred to as $p_i$. The sum of all the branches' probabilities at every node totals 100%, or a probability of 1. For example, if a node (e.g., note 101) has 2 branches (path 111 and path 112) and one has a probability $p_1$ then the other branch has a probability of 1-$p_1$. The probability of a leaf (the occurrence of a particular endpoint of the litigation) is calculated by multiplying the probabilities of each branch that leads to that leaf. For example, the probability of early settlement 104 occurring is the probability of litigation 102 occurring (after an assertion 101)*probability of early settlement 104, which is $p_1$ times $p_2$.

Payoff table 120 represents the "payoff" of each litigation path. The payoff of each leaf is based on two elements: the cost of the outcome of this leaf 121 (e.g., settlement, judgment, etc.) and the cost of litigation 122 incurred in the process. For example winning a case (win node 107) would yield a zero ($0) outcome plus the full cost of litigation, while an early settlement (settlement node 104) would mean low litigation costs but would include the settlement amount as an outcome. The net payoff of the entire tree is calculated by adding the payoff of each leaf multiplied by its respective probability. This net payoff represents the total risk or exposure from that single litigation.

Table 1 below shows the variables used to represent the payoff amounts in the payoff table 120 of FIG. 1.

TABLE 1

| | Litigation Tree variables |
|---|---|
| $p_i$ | Probability of an event occurring |
| S1 | Average Settlement - is a function of the company size and the damage size. |
| X2 | Later settlement Costs - is ⅓ to ½ of the litigation costs X3 |
| X3 | Litigation costs. Vary depending the size of the damage size |
| J1 | Average Judgment of a Jury Trial. Depends on the company size and the damage size |
| J2 | Average verdict awarded by a Judge. Depends on the company size and the damage size |

For purposes of this analysis, all infringement actions are assumed to begin with an assertion 101 by the patentee. This assertion 101 leads to three possible outcomes (nodes 103, 104, and 105). In the first outcome (Early License Agreement), the two parties resolve the matter with a license agreement. In the PIRA model, this scenario is treated in the same manner as Early Settlement 104 (e.g., settlement shortly after litigation is filed) on the assumption that litigation costs and license fees will be similar. In the second outcome, the assertion 101 is dropped (node 103) leading to no litigation costs and no license fee. In the third outcome, the patentee files suit (node 102).

Upon filing of suit (node 102), the model assumes two outcomes. In the first (Early Settlement 104), the two parties successfully negotiate a settlement payment or ongoing licensing deal, avoiding any further court actions ($p_2$). The other possible outcome (Proceed with Litigation 105) is a response by the alleged infringer that substantially denies the claims of infringement by the patentee (1-$p_2$). From here, the process of litigation winds through discovery and eventual resolution by the judge or trial before a judge or jury. Based on the outcome of these proceedings, one party may obtain clear advantage over the other. For example, if during discovery a key piece of prior art is produced which places serious doubt on the validity of the asserted claims, the patentee may happily settle rather than risk a judgment of invalidity preventing the claims from any future assertion. If one party obtains a clear advantage during these proceedings, the parties are likely to agree to a settlement (assuming both are reasonable) and voluntarily dismiss the case ($p_2$). Where the parties are situated on an even playing field moving forward, or both sides believe they hold the advantage, ongoing litigation may be unavoidable (1-$p_2$).

Claim construction is generally considered the pivotal event in the majority of patent infringement cases. During this proceeding (referred to as a Markman hearing) both sides argue their interpretation of the asserted claims. The patentee is generally, but not always, seeking a broader reading of the claim terms, while the accused infringer argues for the opposite, which is typically a narrow, specific reading that does not include their allegedly infringing activities. Again, depending on the outcome of this hearing, that is, how the judge defines the claim terms in light of the parties' arguments, the relative positions of the parties may change dramatically leading to another opportunity for the parties to settle the matter out of court (Late Settlement 106) ($p_3$). If the parties are still unable to meet on agreeable terms, the case will proceed to a final adjudication on the merits. From here, there are two possible outcomes: either the defendant loses (Lose 108) and the court enters judgment in the plaintiff's favor, along with damages and sometimes costs ($1-p_3-p'_3$), or the defendant wins (Win 107) ($p'_3$).

B. Calculation of Risk

Recent research indicates that between 80 and 85 percent of patent infringement actions are voluntarily dismissed before final adjudication, while about 10 percent reach a decision on the merits. However, because a voluntary dismissal by the plaintiff does not necessarily indicate a settlement agreement between the parties, the PIRA model uses the more conservative estimate of 80 percent. Unfortunately, a detailed data for settlement of assertions were not available. Consequently, the model makes some generalized assumptions for the other probabilities. It is possible to incorporate other data as it becomes available, however it should be noted that small changes to the assumptions in the model will not markedly affect the result. In the litigation tree 100, the sum of the probabilities of different outcomes are equal to one. Also, using the 80 percent figure noted above for the percent of patent infringement actions that are dismissed before adjudication then the sum of the probability of Early Settlement and Late Settlement are equal to 80 percent given the assumptions. The model also assumes that the probability of a settlement before the Markman hearing ($p_2$) is equal to 50 percent. The probability of settlement subsequent to the Markman hearing ($p_3$) would therefore be equal to 30 percent. Adding these two probabilities together yields an 80 percent chance of litigation ending in a settlement—an assumption of the model. Cases that do reach a final decision are assumed to split down the middle, having an equal chance of a verdict or decision for the plaintiff or defendant. This data is reflected in the litigation tree 100, where $p'_3$ and $1-p_3-p'_3$ both equal 10 percent. The PIRA model therefore works under the assumption that all cases either settle or are finally adjudicated. While this does not completely reflect reality (some cases are dismissed in a manner that allows for refiling), for the purposes of the model these possibilities were ignored due to the fact that cases that are transferred or dismissed often lead to subsequent litigation in a different forum.

Another assumption made was that 50 percent of settlements occur before litigation begins. Therefore, $p_1$ and $1-p_1$ are necessarily both equal to 50 percent. Additionally, for determining litigation costs, cases are divided among those that settle before the Markman hearing (Early Settlement 104) and cases that settle after (Late Settlement 106). Of cases that settle during litigation, 67 percent were assumed to settle before the Markman hearing ($p_2$), and 33 percent were assumed to settle after the Markman hearing ($p_3$). Finally, the model assumes, consistent with a 2009 Patent litigation study, that 67 percent of patent infringement cases are tried before a jury, and the remaining 33 percent of cases are heard by a judge.

Applying this data to the litigation tree, a formula was developed, as shown below in Table 2, where $S_R$, $J_R$, and $LC_R$ are equal to the estimated settlement (S1), judgment (J1) and litigation cost amounts determined by revenue:

TABLE 2

| Formula for calculating estimated risk |
|---|
| Estimated risk (Payoff) |
| $0.8S_R + .1J_R + .35LC_R$ |

Data Mining

The data gathered to develop the PIRA model was mined mainly from publicly available sources. While some sensitive information may be redacted upon request and court approval, nearly all documents filed in support of a patent infringement action are publicly available on the government-hosted website PACER (Public Access to Court Electronic Records). Within PACER, cases were filtered to include only civil cases filed within the past ten years with a nature-of-suit (NOS) listing of 830. This filing code is exclusively used for patent infringement actions. Based on the results, a list of case titles was downloaded and examined for suits involving only defendants within the software industry. This process resulted in 91 judgment awards against software companies in patent infringement rulings as shown below in Table 3.

TABLE 3

| Judgment Data | | | | |
|---|---|---|---|---|
| Number of Data Points | Mean | Median | Minimum | Maximum |
| 91 | $82.20M | $20.38M | $184K | $1500B |

While judgment information is largely available from public court records, settlement data is largely undisclosed to the public. Even when settlement figures are disclosed, they are rarely contained in court documents. Instead, data was gathered from various online sources such as Google, Law360, Westlaw and SEC EDGAR simply by searching for keywords, such as 'settlement', 'patent infringement' and 'software'. This method yielded 82 settlement figures resulting from software related patent infringement actions as illustrated below in Table 4.

TABLE 4

| Settlement Data | | | | |
|---|---|---|---|---|
| Number of Data Points | Mean | Median | Minimum | Maximum |
| 82 | $60.57M | $8.75M | $90K | $750M |

However, the settlement data available represents only a skewed subset of the entire settlement population. Typically, settlements are not disclosed. Organizations are obligated to disclose settlement data only when the settlement will have a significant financial impact on the overall organization. This means that, in general, only large settlements are typically made public. The "Settlement Analysis" section below describes how the PIRA model assesses the settlement average of the entire population, rather than the average of a skewed sample set of publicly available data.

The final information mining exercise comprised gathering revenue figures for each company appearing in the list of cases of companies sued for patent infringement, as shown in Table 5 below. To most accurately compare company revenues and litigation outcomes, it was necessary to determine specific revenue figures for the particular year in which a company was sued. For example, Apple, Inc. was sued for patent infringement in 2005, 2006, and again in 2007. It was therefore important to determine how Apple's revenue numbers changed over the span of three years to reflect a more accurate relationship between the outcome amount and company size. For publicly held companies, revenue information is readily available from the SEC EDGAR website. Revenue information for private companies is not typically disclosed. Therefore the model's database is comprised mainly of publicly held companies. Any private companies represented therein have either disclosed their revenue figures on their own or third-party estimates were used in place of official figures.

TABLE 5

Revenue Data

| Number of Data Points | Mean | Median | Minimum | Maximum |
| --- | --- | --- | --- | --- |
| 140 | $16,433M | $1.703M | $50K | $118.928M |

Because the outcome of actions against high-revenue companies varied widely from hundreds of thousands to hundreds of millions of dollars, the model elects to express the relationship in terms of an effective rate (e.g., outcome divided by revenue) compared to revenue rather than showing a direct correlation between outcome and revenue. Taking the data as a whole, there is a very clear correlation between this ratio and the outcome of litigation, illustrating the power of revenue as an estimate for litigation outcome.

Figure 2:
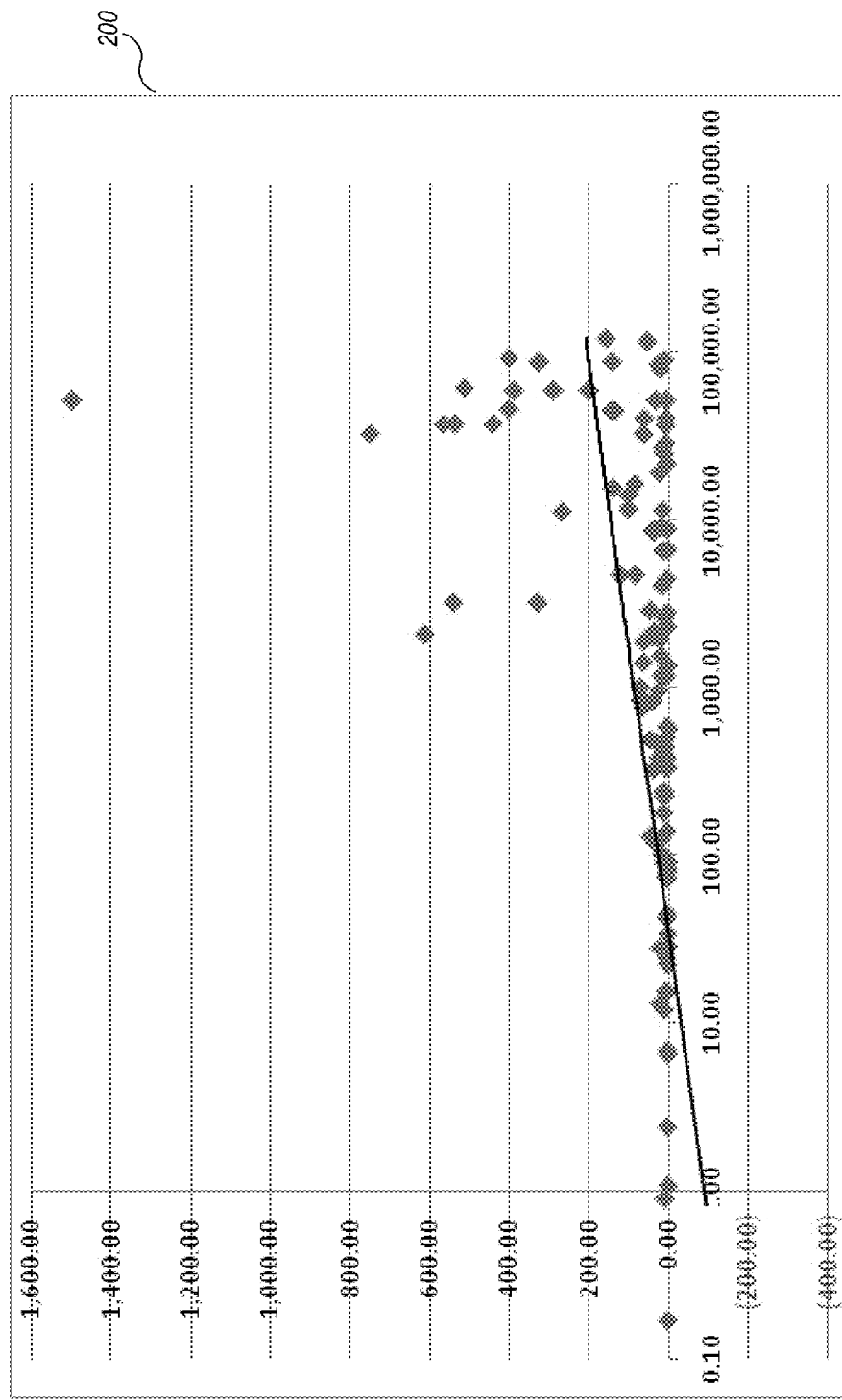
FIG. 2 is an example chart that represents each settlement and judgment data point from the mined data mapped against revenue on a logarithmic scale.

FIG. 2 is an example chart that represents each settlement and judgment data point from the mined data mapped against revenue on a logarithmic scale. A logarithmic scale is useful to mitigate the wide range of company sizes that populate the model's database. This chart also shows the distribution of judgment and settlement amounts clustered within discreet buckets of revenue.

Estimating Judgment Costs

Figure 3:
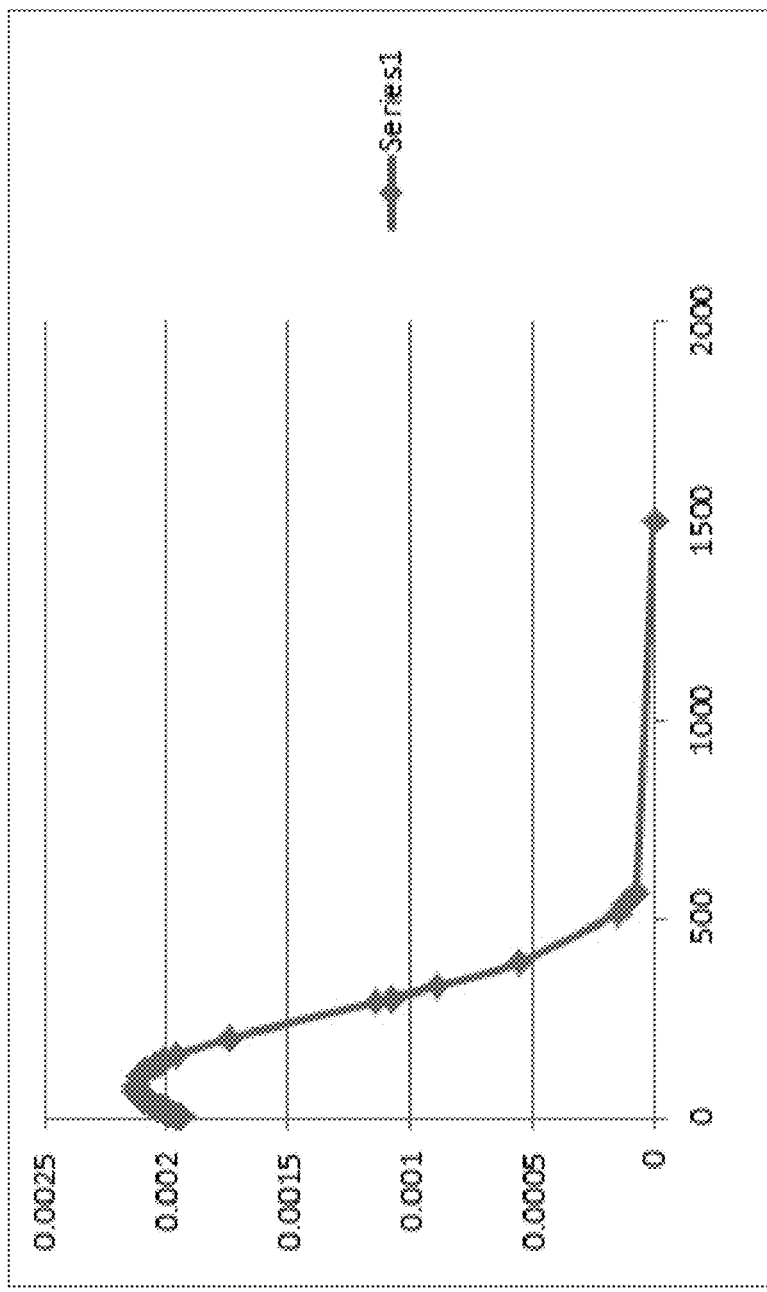
FIG. 3 is an example chart that shows that the judgment amounts of example cases fall along a normal distribution curve.
Figure 4:
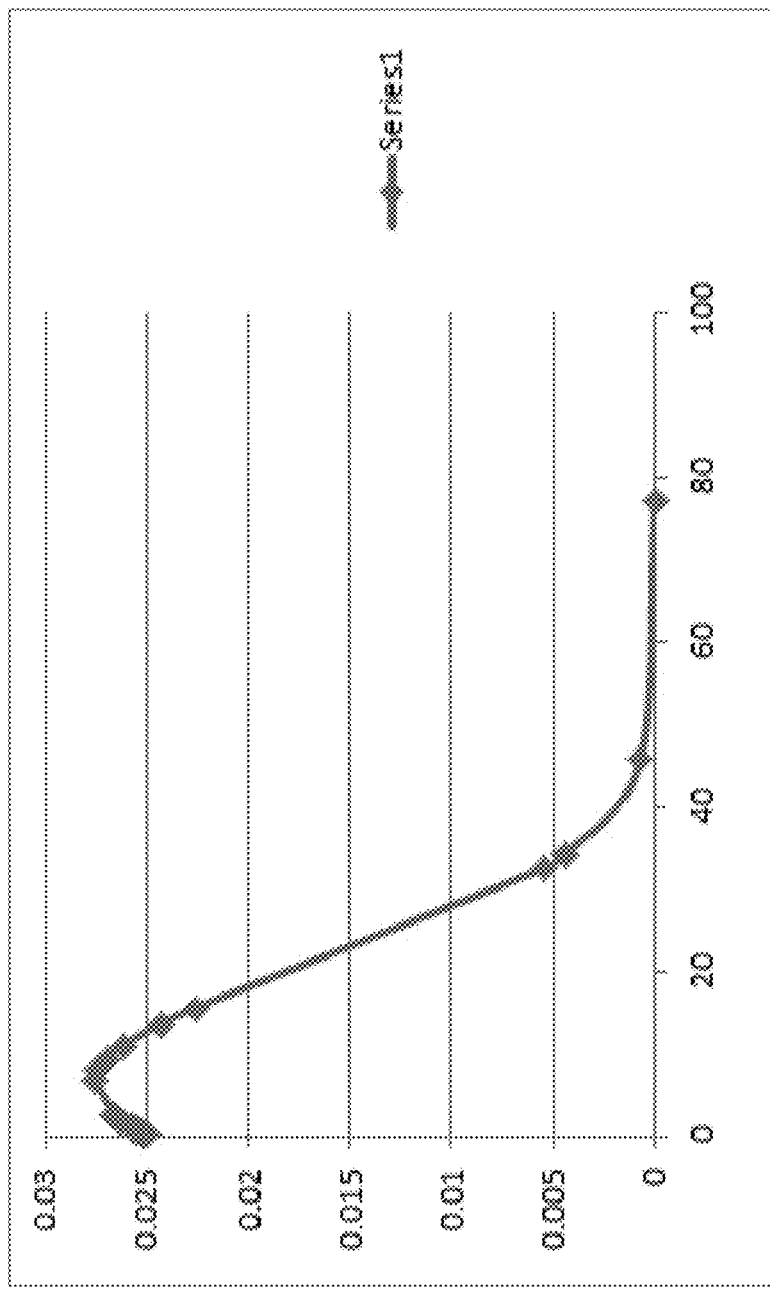
FIG. 4 is an example chart that shows the normal distribution of the ratio of judgment amounts to revenue per year.

Initially, the model assumed that the outcome of patent infringement cases finally adjudicated would be binomial, either the plaintiff wins or loses. However, after reviewing the distribution of judgment amounts, it was determined that the data points align on a normal distribution curve. These results are shown in FIGS. 3 and 4. FIG. 3 is an example chart that shows that the judgment amounts of example cases fall along a normal distribution curve. FIG. 4 is an example chart that shows the normal distribution of the ratio of judgment amounts to revenue per year.

After analyzing the distribution of example case data points, the judgment and settlement outcomes were divided into distinct buckets based on the annual revenue of each defendant. It was determined that four groupings maximized the correlation between revenue and the magnitude of the outcome (see Table 6 and FIG. 5).

TABLE 6

Judgment Data by Bucket

| Revenue Bucket | $0-$80M | $80M-$800M | $800M-$5B | >$5B |
| --- | --- | --- | --- | --- |
| Mean (Judgment) | $6.75M | $20.53M | $55.04M | $168.64M |

Figure 5:
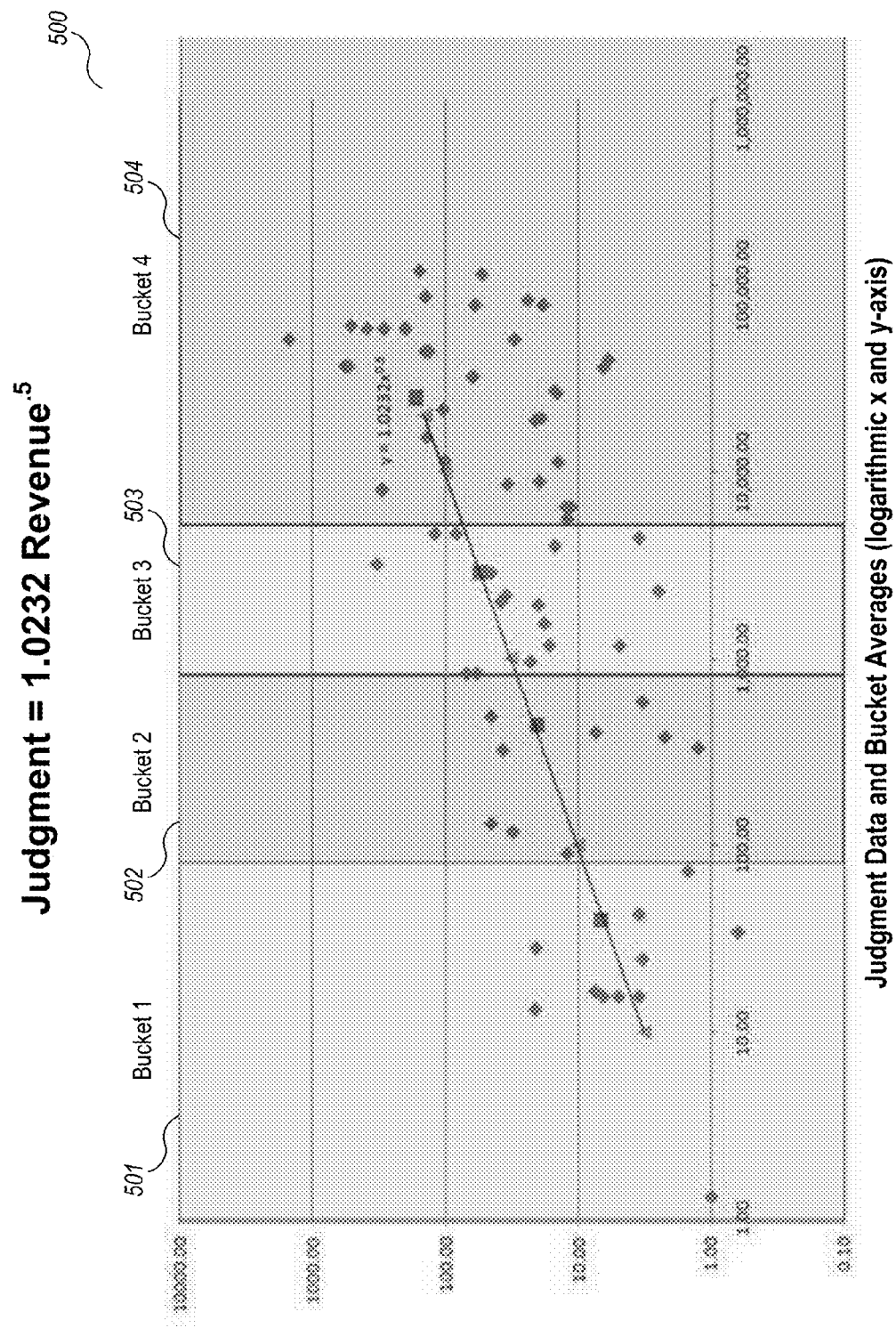
FIG. 5 illustrates an example chart with multiple buckets of judgment data.

FIG. 5 illustrates an example chart with multiple buckets of judgment data. The four buckets 501-504 shown in chart 500 correspond to the buckets identified in Table 6. Thus, in bucket 1 (bucket 501), a company earning revenue of, for example, $0-$80M, can expect a (mean) outcome of 6.75M. Similarly, in bucket 2 (bucket 502), a company earning revenue of, for example, $100M, can expect a litigation outcome of $20.53, and so on. In other examples that use other data, it is possible that different size buckets may maximize the correlation between revenue and outcome.

Figure 6:
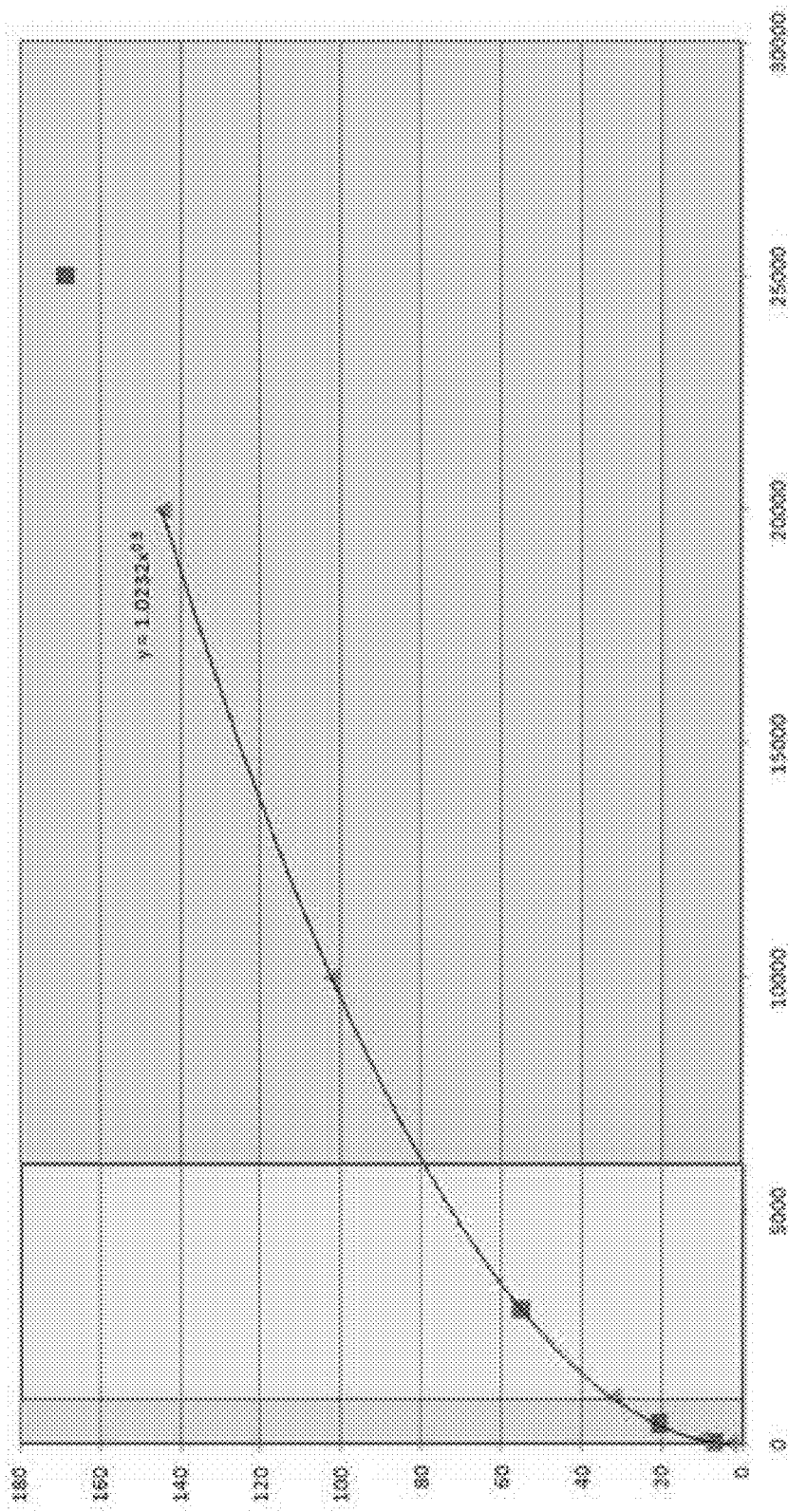
FIG. 6 is an example chart that shows a best fit curve for the average judgment data points for each revenue bucket.

The average judgment was then calculated for each bucket, which resulted in a significantly higher correlation. This means that the data was normally distributed within a revenue bucket centered around the average. The average of each bucket was then used to calculate the best fit curve that traversed these data points. The high correlation in each bucket means that the data was evenly distributed within each bucket and could therefore be represented by its average and would align nicely on a best fit curve. Because the average data points were tightly aligned between buckets, the best fit curve showed an increasing rate of exposure while maintaining a high $R^2$ correlation. FIG. 6 is an example chart that shows a best fit curve for the average judgment data points for each revenue bucket. As a result the model concluded that the average judgment of a company was reasonably represented by the equation shown in Table 7 below.

TABLE 7

Judgment Estimate
(x = annual revenue in Million US$)

Judgment
$J(x) = 1.0232 \text{ Revenue}^{.5}$

To validate these equations, it was first determined that the overall correlation was just under 0.5. Because the data is closely aligned within the four revenue-buckets, correlation within each bucket was also calculated. While the data points were in general tightly aligned, each bucket contained outliers that had the effect of distorting the effective correlation. To compensate for these outliers, the two data points furthest removed from their expected value within each bucket were disregarded. For example, in the largest bucket, a $1.5 billion judgment was recorded against a company with annual revenues of $54 billion. The expected value of this judgment was $231 million dollars, which is only about 15% of the actual outcome.

The computed values demonstrate a markedly higher degree of correlation within the middle two buckets compared to the bucket with the largest and smallest revenues. First, this likely can be attributed to the high variability of outcomes in the largest bucket. After excluding the two most extreme data points, outcomes in this data set range from $6.5 million to $512 million for companies with revenue greater than $5 billion. The average calculated judgment amount within this bucket is $192 million, which represents the expected outcome in general but is not a good approximation of extreme cases. Second, within the smallest data set, the outcomes range from $630,000 to $6.5 million. While these outcomes do not appear extreme compared to the other buckets, when compared to the relatively small revenues of the defendant companies, the extremes greatly affect the correlation within the bucket.

The $R^2$ (coefficient of determination) for the equation derived from the entire data set (0.38) was determined and it was discovered that by using the buckets approach a higher R square (0.49) value was determined. The explanation behind the result stems from business facts. The division in several buckets seems tied to the fact that large organizations attract more litigation of a diversified nature than smaller organizations. For example non-practicing entities rarely pursue organizations that fall in the lower buckets (i.e., entities with small revenues). Large organizations will assert their IP rights against a smaller organization generally as an IP protective measure. Large organizations will often engage in the ritual of assertion and counter-assertion to finally settle their differences using their IP "war chest". These examples illustrate how very distinct behavior towards litigation is displayed across various buckets. It also shows that within a bucket, companies seem to have similar behavior vis a vis IP Litigation. This pattern reinforces the selection of the buckets and explains the higher correlation or coefficient of determination within a bucket.

Estimating Settlement Costs

Settlement costs were more complex to assess for several reasons. The most important one was that settlements are not all publicly available. Generally, the only data made public are settlements that are fiscally material to an organization. This lead the developers of the PIRA model to conclude that, within a bucket, these settlements are the larger end of the settlement range. This means that the model only has access to a skewed set of data. The calculated average results of the skewed data set are shown below in Table 8.

TABLE 8

Publicly Available Settlement Data in Millions of Dollars

| Revenue Bucket | $0-80M | $80M-800M | $800M-5B | $5B |
|---|---|---|---|---|
| Mean (Settlement) | $4.63M | $12.09M | $129.56M | $153.23M |

Using the same approach as the one followed with the judgments and given the averages per bucket, the best fit curve for "Hi End" settlements can be approximated by the function shown in Table 9.

TABLE 9

Hi End Settlements Estimate
(x = annual revenue in millions of dollars)

"Hi End" Settlement
$S_{HI}(x) = 0.2786 \text{ Revenue}^{0.545}$

Figure 7:
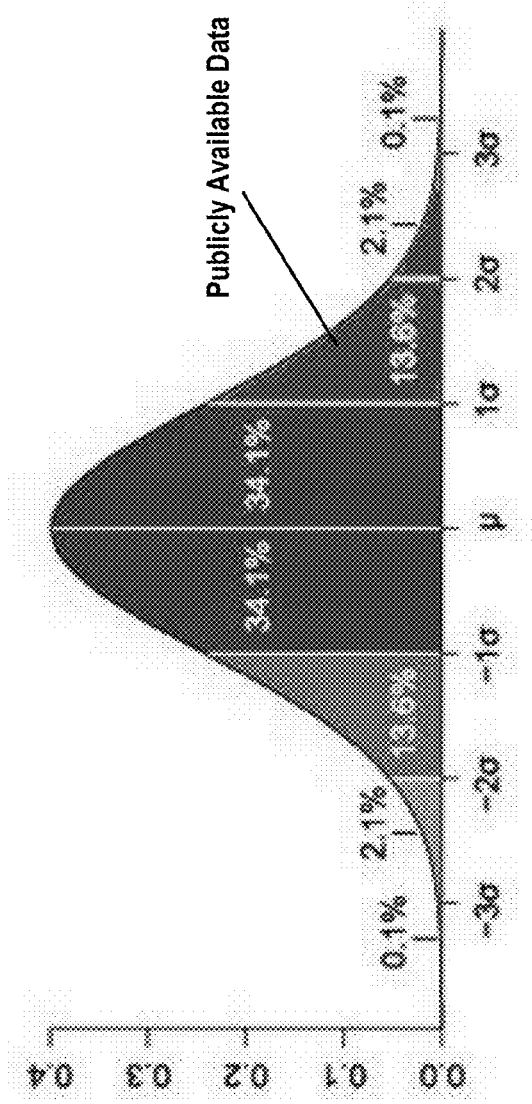
FIG. 7 is an example chart that shows settlement data as a normal distribution curve.

The objective though, is to estimate the entire population of settlements, not only the average of the data we collected. To achieve this goal, the model assumed that, similar to judgments, settlements follow a normal distribution; however, the challenge is how to measure the "actual average" ($\mu$) from a set of data that represents only the tail end of the distribution. FIG. 7 is an example chart that shows settlement data as a normal distribution curve.

The normal distribution is described by equation (1):

$$f(x) = \frac{1}{\sqrt{2\pi\sigma^2}} e^{-\frac{(x-\mu)^2}{2\sigma^2}}, \tag{1}$$

where f(x) is the probability and x is the size of the company, $\mu$ is the mean and $\sigma$ the standard deviation.

In order to determine how far the representative sample was down the "right tail" of the curve the number of cases were counted that ended in a settlement via PACER. This number was then compared to the data that could be collected for each one of those settlement cases. The data represented just under 15% of the cases that ended in settlements. Based on this data an assumption was made that the model covered all the data beyond 1 standard deviation, $\sigma$ (or 15.7% of the data). From the distribution of the data in the tail end of the normal distribution curve, the entire curve can be retraced using a Gaussian function as shown in equation (2):

$$f(x) = \frac{1}{\sqrt{2\pi\sigma^2}} e^{-\frac{(x-\mu)^2}{2\sigma^2}}, \tag{2}$$

To calculate the actual average, $\mu=\alpha^*\mu_1$ as a function of the measured high end average, the following approach was used: The high end average $\mu_1$ is located ⅓ of the way between 1 $\sigma$ and 3 $\sigma$. In other words $\mu_1=\mu+1.666\sigma$.

This conclusion can be derived either by measuring the area under the cumulative probability curve $\phi(x)$ below between x=$\sigma \rightarrow \infty$ and equating it to 15.7% as shown in equation (3):

$$\Phi(x) = \frac{1}{\sqrt{2\pi}} \int_{-\infty}^{x} e^{-t^2/2} dt = \frac{1}{2}\left[1 + erf\left(\frac{x}{\sqrt{2}}\right)\right], x \in \mathbb{R}. \tag{3}$$

for x=$-\infty \rightarrow \sigma$, $\phi(x)$=100%-15.7%=0.843.

Figure 8:
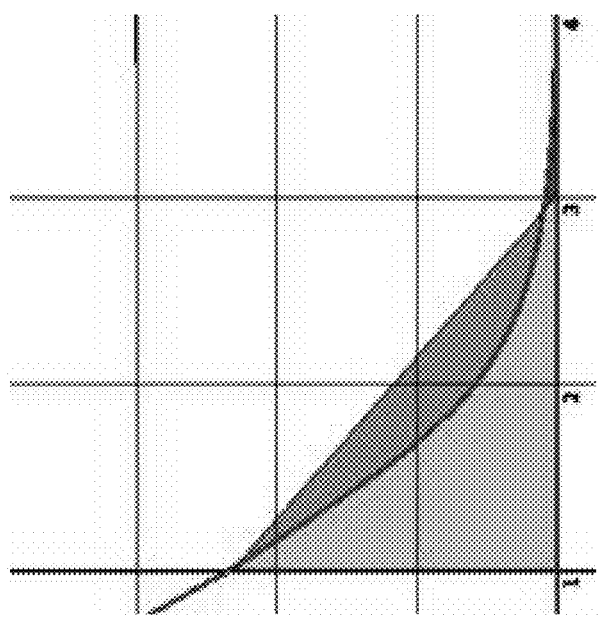
FIG. 8 is an example chart of a tail end of a normal distribution curve.

This can be approximated by a triangle the base of which spans from 1$\sigma$ to 3$\sigma$. FIG. 8 is an example chart of a tail end of a normal distribution curve.

By calculating the area under the curve and dividing by the average the location of this average can be identified. The calculation shows that this point is $\mu_1$ at ⅓ of the distance between 1$\sigma$ and 3$\sigma$. This leads to the conclusion that the average can be approximated as $\mu_1=\mu+1.666\sigma$. Thus, as equation (4) demonstrates:

$$\sigma=0.6^*(1-\alpha)\mu \tag{4}$$

If the $\sigma$ in the cumulative distribution function $\phi(x)$ is replaced and one solves equation (4) for the settlement data, equation (5) is obtained:

$$\alpha = \frac{1}{1 - \sqrt{2\pi}} = 0.663733727 \tag{5}$$

In other words the actual average of the entire population of settlements can be approximated by calculating the high end settlements and multiplying the estimated result by $\alpha$. Note that this is only an estimate and it applies to the sample data that was analyzed under the assumption that the distribution of the entire settlement population is normally distributed. This means that the hi end estimates can be used and multiplied by $\alpha$ to measure the estimated settlement for the entire population as shown in Table 10 below.

TABLE 10

Settlement Estimate
(x = annual revenue in Million US$)

Entire Population Settlement
$S(x) = 0.185 \text{ Revenue}^{0.545}$

Estimating Litigation Costs

Figure 9:
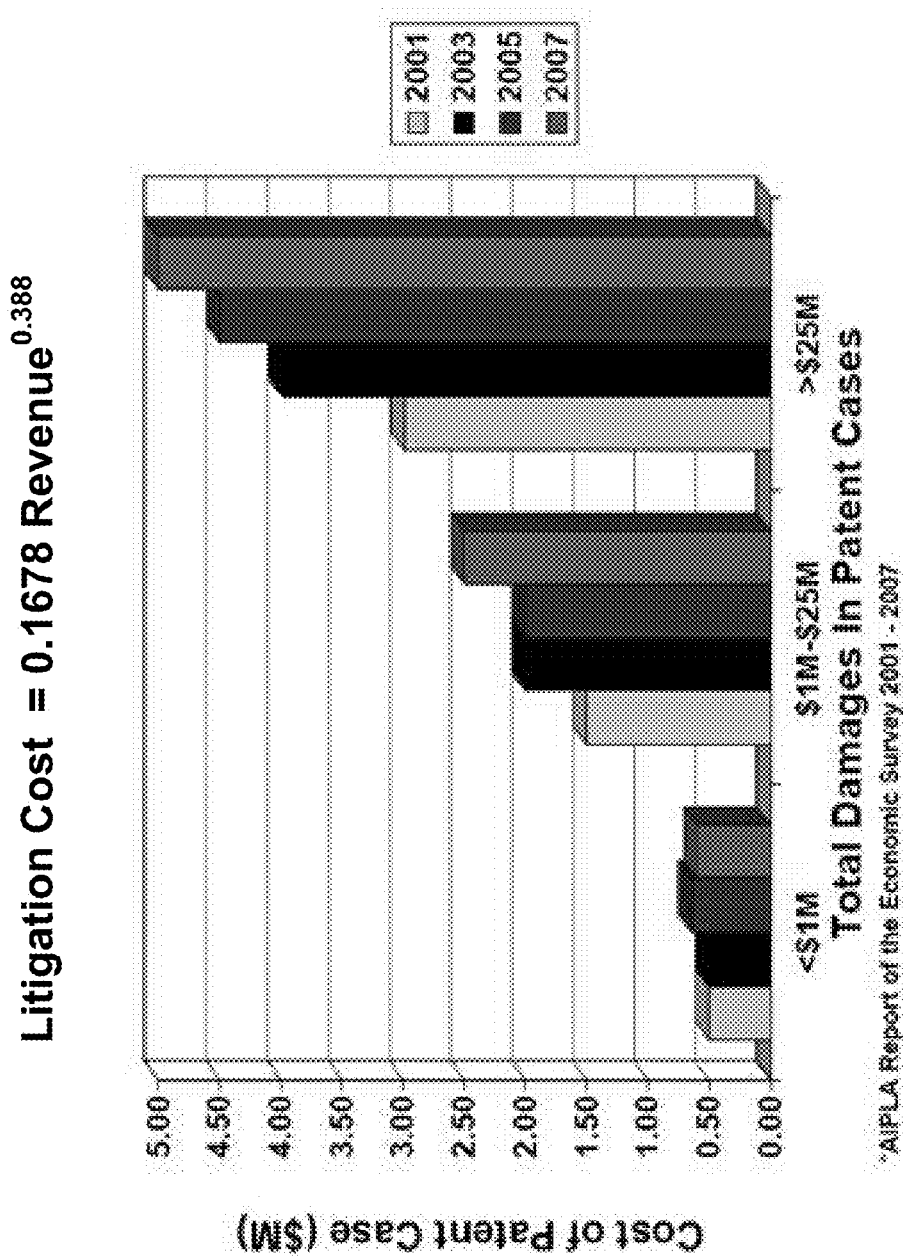
FIG. 9 is an example chart showing a study of costs of litigation relative to total damages.

Next, the model determined the total litigation costs associated with a patent infringement suit. The analysis indicated that litigation costs of an average patent infringement case can often run between $3 million and $10 million over two or three years of litigation. This high cost of litigation is one factor that motivates parties to reach an agreement out-of-court, avoiding years of uncertainty and expense. A more detailed study, performed by the AIPLA, found three distinct buckets of infringement actions yielding different costs of litigation depending on the total damages. FIG. 9 is an example chart showing a study of costs of litigation relative to total damages. In FIG. 9 shows three distinct buckets of behavior: <$1 M, $1 M-25M, and $>$25M.

In the PIRA exposure model, the cost of a litigation is instead based on the size of the company. Given that there was a tight link between the size of the company and the size of the judgment, i.e., a small company with revenues of $100M could not be assessed damages of the same amount, while for a company of several billion dollars a judgment of $100M is more common. Based on the fact that larger company revenue equate to larger possible judgments, the model transposes the data from damages to company size measured in revenues, as shown in Table 11.

TABLE 11

Litigation Costs by Company Size

| Total Damages | <$1M | $1M-$25M | >$25M |
|---|---|---|---|
| Litigation Cost | $.5M | $2M | $4M |
| Company Size | <$80M | $80M-$800M | >$1B |

Using these data and their middle points the model derives the best fit curve as shown in Table 12:

TABLE 12

Litigation Costs Estimate
(x = annual revenue in millions of dollars)

Litigation Cost
$LC = 0.1678 \, Revenue^{0.388}$

Additional Attributes of the PIRA Model

Post Litigation Settlements

While some data may sound redundant as a settlement occurred post verdict, the model considers the extent of the exposure of the company to be the amount of the judgment. In other example models, such post verdict settlement may be included.

Average Versus Maximum Exposure

It may be argued that using averages may not reflect the real exposure of a company. Instead of an average, a maximum envelope could be used as companies should shield themselves against the high risk events. While this argument has merit in some circumstances, there are two elements to bear in mind:

(1) The purpose of this example model is to characterize the exposure and obtain some metrics around its order of magnitude for an organization. It is not intended to provide a specific maximum value to any patent litigation exposure.

(2) While a company may be exposed to a high risk event every year, over the long run it may not be subject to a high risk event repeatedly year after year. In other words, on an aggregate basis and over several years, using an estimated exposure of a company should better reflect the company's typical exposure than using its maximum exposure.

In other examples of the PIRA model, maximum values are used instead of averages. In addition, in yet other examples, values different than either the maximum or the average may be similarly incorporated.

Potential Limitations of this Data

This precise model with formulas built based upon the data discussed was built for the software industry where there are very few benchmarks on patent licensing. The data model may need some adjustments to be applied to other industries or sectors. However, the PIRA methodology is independent of the industry and can be repurposed. For example, the process of collecting the data, dividing the population of the data into buckets, and calculating coefficients between the judgment data and company revenue, etc. may be performed in industries other than software to achieve corresponding models.

Exposure Versus Revenue

The exposure alone may have very little meaning for a company. What typically is pertinent is its impact on profits. Every company strives to achieve a certain level of profitability, often measured as a ratio of its income. Quantifying exposure is meaningful when it is related to the size of the company. In other words an exposure of $10M is significant for a company with revenues of $80M and profits of $8M as this exposure can mean the difference between profitability and loss. In contrast, the impact of an $80M exposure on a company with $8B in profits is significantly less. Tools built upon the PIRAS technology may incorporate this relative impact.

Tail End Data as Used to Estimate Other Averages

Similar to settlement data, the PIRAS technology may be used to estimate averages of other data when only a high tail end or low tail end of the data is available. In some examples, the tail end of the data constitutes less than 30 percent of the data.

For example, a method for automatically determining an approximation of entire population of data, such as for data that relates to at least one of an e-commerce market, a human population, and/or a price of a product or service, may comprise: 1) receiving an indication of a segment of data that represents a high end tail or low end tail of data of a statistical distribution of the entire population of the data; 2) performing a calculation on the segment of data to reach an initial result; 3) estimating the actual average of the entire population by multiplying the initial result by a constant; and 4) forwarding the estimated actual average to a computer-implemented analysis tool. The calculation on the segment of data may be a price of a good or service in which case the estimated actual average yields, for example, a desired price of the good or service to charge to a customer. In some cases, the desired price is the optimum price. As described above, in some examples, the constant is equal to $1/(1-\sqrt{2\pi})$. In some examples, the statistical distribution represents a Gaussian (normal) distribution.

In some examples, the method for automatically determining the approximation of the entire population of data from a tail end of the data is performed by a computer-implemented price estimation tool having a memory, a computer processor, an input module and a calculation module. In one example, the input module is configured to receive an indication of a segment of data that represents a high end tail or low end tail of data of a distribution of the entire population of the data. The calculation module is configured to perform a designated calculation on the segment of data to reach an initial result, estimate the actual average of the entire population by multiplying the initial result by a constant; and return the electronically estimated actual average as a desired result. In some examples, the constant is equal to $1/(1-\sqrt{2\pi})$.

Patent Infringement Risk Assessment Tool

FIGS. 10-14 are example user interface screens from an example Patent Infringement Risk Assessment Tool built using the methodologies and data models described in FIGS. 1-9. Although different and other applications (tools, services, etc.) may be derived using PIRAS technology, the application described in FIGS. 10-14 is a web-based SaaS (software as a service) application.

Figure 10:
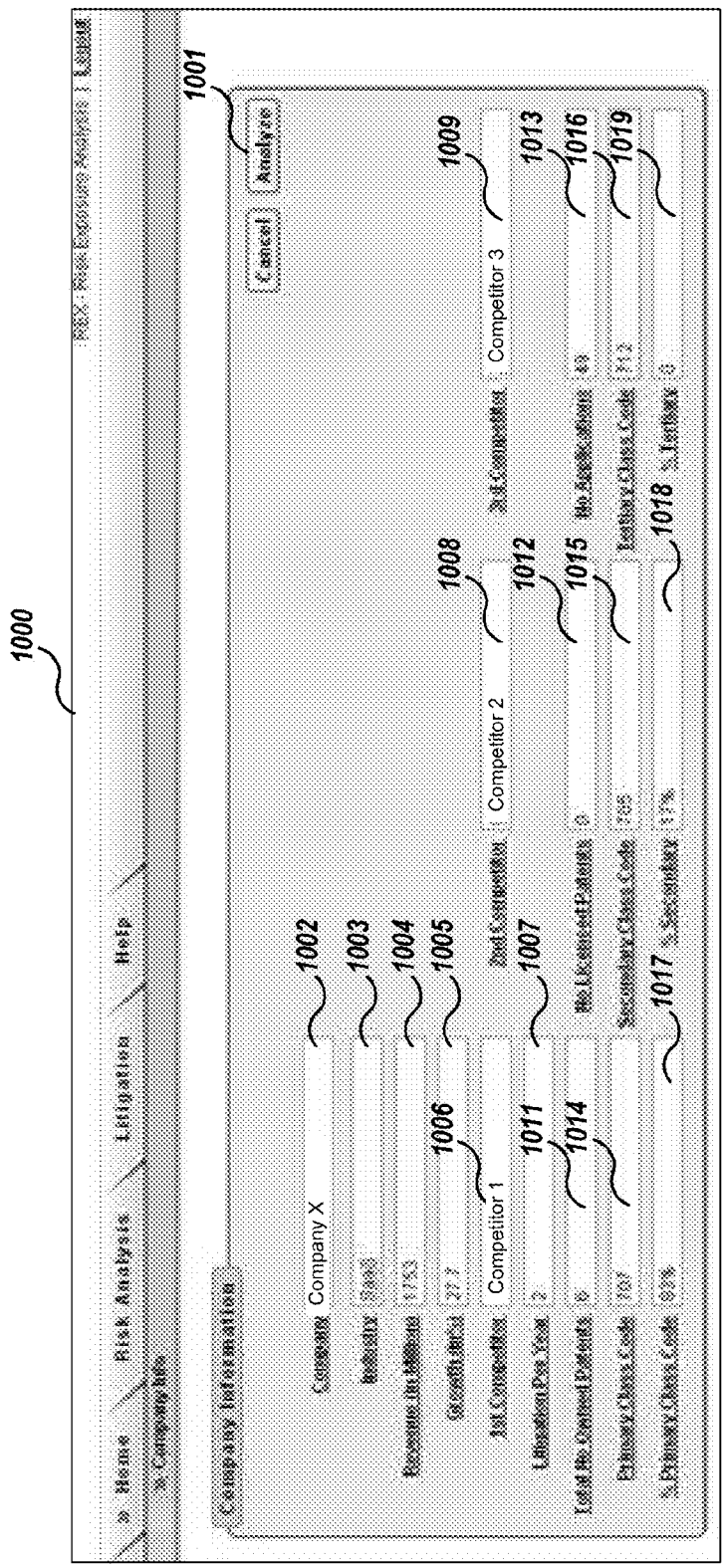
FIG. 10 is an example input screen from an example Patent Infringement Risk Assessment Tool built using the example methodologies and data models.

FIG. 10 is an example input screen from an example Patent Infringement Risk Assessment Tool built using the example methodologies and data models. As shown in FIG. 10, the Patent Infringement Risk Assessment Tool ("PIRAST") allows a user to input into the fields of form 1000 company information, such as annual revenue, growth rate, and recent litigation history, and returns various information related to patent infringement risk analysis. In particular, the information entered into fields 1001-1019 is used to analyze the company's risk of patent related litigation, predict the likely magnitude of an infringement-related judgment or settlement, and identify problematic gaps in patent coverage.

In particular, company field 1002 is used to indicate the company name or ticket symbol; industry field 1003 is used to indicate the industry most relevant to the company's business; revenue field 1004 is used to indicate the total annual revenue in millions of dollars; growth field 1005 is used to indicate the company's growth as a percentage of annual revenue; competitor fields 1006-1009 is used to indicate up to three competitors for portfolio comparison; and litigation/year field 1007 is used to indicate the number of recent patent infringement suits brought against the company. Patent information fields 1011-1019 are used to indicate information about the patent portfolio (coverage), if known, of the company. Fields 1011-1013 are used to indicate the total number of owned patents, licensed patents, and patent applications, respectively. Fields 1014-1019 are used to indicate the various class codes (primary, secondary, and tertiary) assigned to these patent assets and as what percentage of the portfolio. In other example PIRASTs, other and/or different input fields may be similarly incorporated.

Figure 11:
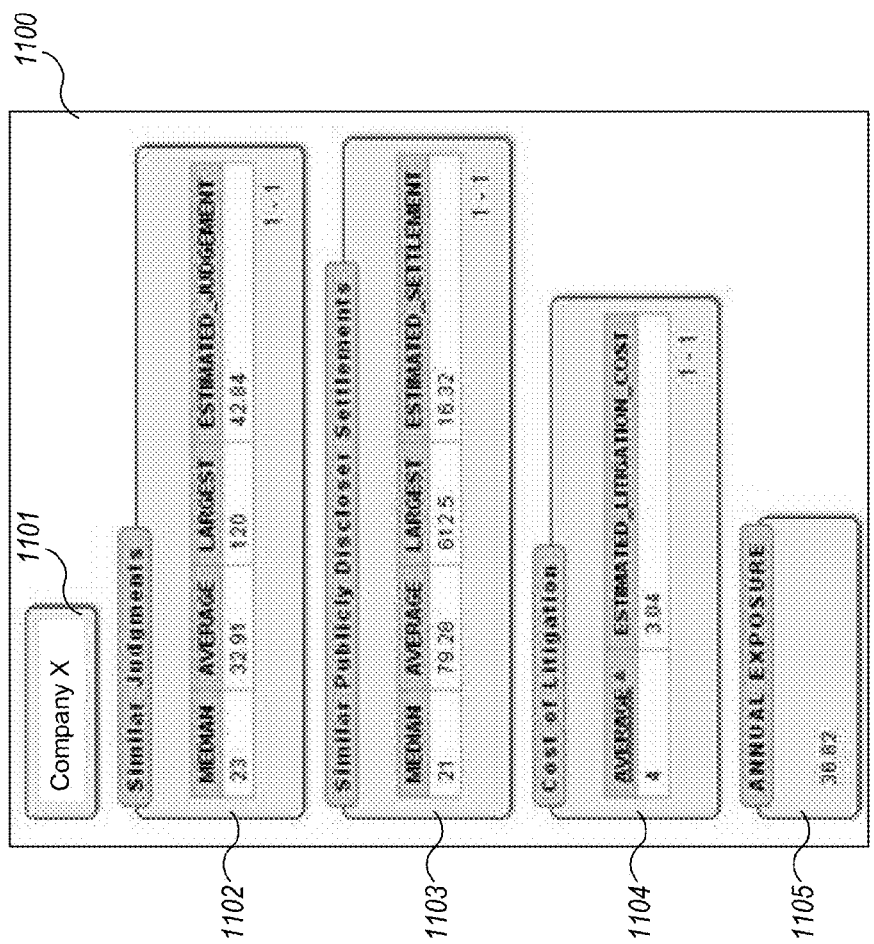
FIG. 11 is an example display screen of example data returned from an analysis using an example Patent Infringement Risk Assessment Tool.

FIG. 11 is an example display screen of example data returned from an analysis using an example Patent Infringement Risk Assessment Tool. Display screen 1100 currently shows information relating to Company X shown in field 1101. In the first field, output field 1102, the PIRAST displays the result of prior litigation faced by similarly situated companies, for example those with similar annual revenues. For example, as shown, field 1102 displays the mean, median, maximum and estimated judgments of companies from within the same revenue-bucket. This data is derived from a litigation database comprised of similarly sized companies. The numbers help give the user some feel of what best or worst-case scenarios may look like. In addition, the mean and median outcomes identify a likely range of outcomes. The estimated judgment size is calculated with respect to a company's annual revenue based on litigation trends observed in the software industry. The coefficient of determination is equal to 0.9991.

Output field 1103 contains data regarding companies with similar public disclosure statements (e.g., those with similar annual revenues) and their respective settlement cost information. The median, average, and largest judgment are derived from a litigation database comprised of similarly sized companies. The estimated settlement size is calculated with respect to a company's annual revenue based on litigation trends observed in the software industry. The coefficient of determination is equal to 0.9824.

Output field 1104 shows an estimated litigation cost and average litigation cost for the present company (field 1101) based upon its revenue. The coefficient of determination is equal to 0.9262.

Output field 1105 shows an annual exposure value based upon the PIRAS methodologies and data models described here. Specifically, in some example PIRAS tools, an annual exposure value is calculated as a function of the number of estimated litigations per year multiplied by the estimated risk for each litigation as defined in Table 2. For example, the annual exposure value may be calculating using equation (6):

$$\text{func}(LY)*(0.8S_R+0.1J_R+0.35LC_R) \quad (6)$$

Where LY is the average number of litigation per year and func (LY) represents some function of LY. In its simplest form, the function of the number of average litigations per year is simply the number of average litigations. In other example PIRASTs, the function of the number of average litigations per year accounts for the observation that each litigation does not cost the company the same amount and it is likely that the nth litigation in a single year poses an attenuated risk relative to the first litigation.

In order to best represent the risk to a particular company, it may be desirable to compare the magnitude of risk to the size of the company based on annual revenue. The risk of a $10 million judgment is of much greater impact on a small software firm compared to a multi-billion dollar corporation. In addition, a number of other factors influence the annualized risk exposure to a company. For example, as mentioned earlier, a company may attempt to mitigate risk through its patent portfolio.

Figure 12:
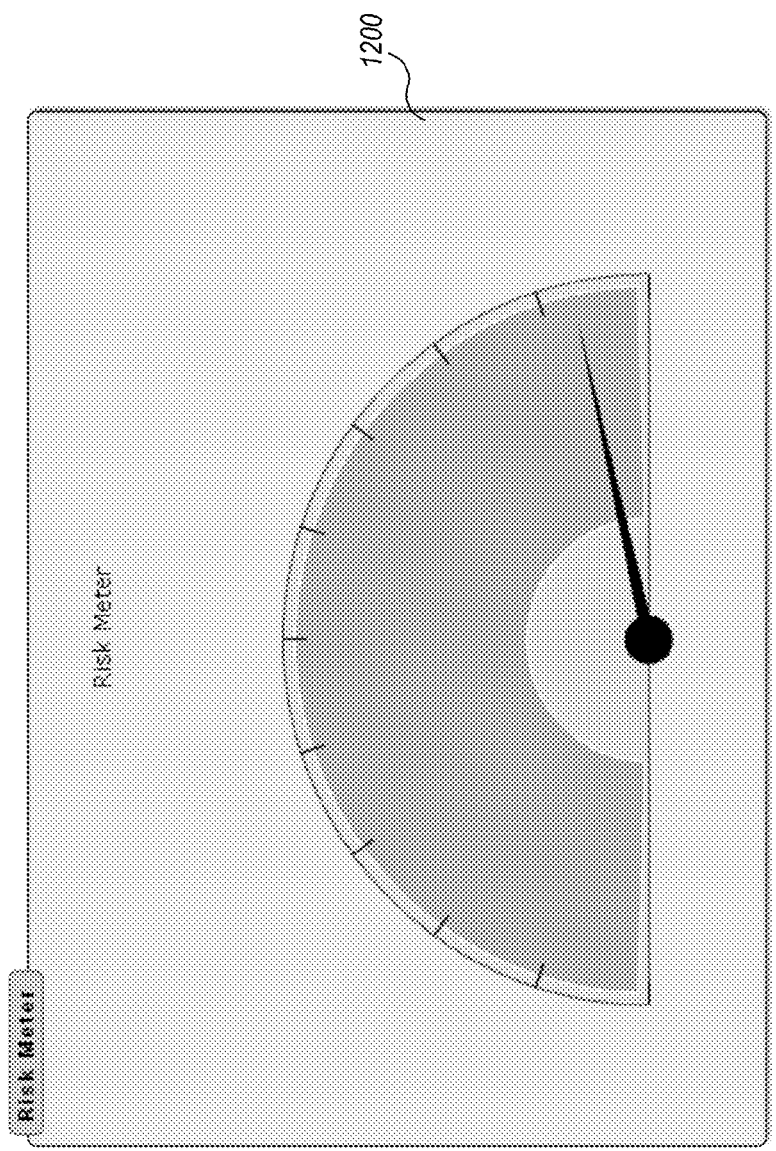
FIG. 12 is an example risk exposure meter based upon the example PIRAS techniques that adjusts for other factors.

FIG. 12 is an example risk exposure meter based upon the example PIRAS techniques that adjusts for other factors. The revenue exposure meter 1200 displays the overall exposure to a company in relation to its overall revenue adjusted for other factors. This allows a company to look at the output of the formulae and quickly determine exposure.

The following equation (7) is used to calculate this adjusted annual exposure value:

$$\text{Adjustment Factor} = R*G*L*C*1/(P+P_L/2+P_A/3) \quad (7)$$

where,

R=Annual revenue in millions of dollars;

G=Annual revenue growth rate as a percent;

L=Number of patent infringement actions brought against the company in the past 2.5 years;

P=Number of patents held by the company;

$P_L$=Number of patents licensed to the company;

$P_A$=Number of active patent applications held by the company; and

C=The distribution of patents across various class codes.

First the input values are normalized to a value between 0 and 1. For example, for revenue "R," a normalized value is obtained by equation $$R\max - R/R\max - R\min \quad (8)$$

where Rmax is the maximum revenue that any company in the data set has (or some other measure); Rmin is the minimum revenue value that any company in the data set has; and R is the revenue of the current company. That way the revenues (R) can be compared with number of patents (P), etc. in a meaningful manner. Each value may be similarly normalized. The subsequent discussion in this section refers to the normalized data. The adjustments result in multiplying the annual exposure value by a factor (which is less than 1). So, in other words, the adjustments potentially provide a mitigation of the annual exposure of the company.

Specifically, in order to determine the magnitude of risk to the company, the company's annual revenue (R) is multiplied by a fraction of the company's annual growth rate (G). This takes into consideration smaller companies that may be growing at high rates, placing themselves on the radar or potential litigants. The next factor considered is the distribution of the company's patent portfolio among the various class codes as determined by the United States Patent and Trademark Office (or other similar agency category designation). A company with a more diverse portfolio is generally better protected from threats of litigation from competitors or other operating entities than a company with patents isolated in a single class code. Next, the rate of patent litigation suits brought against the company (L) is factored in to determine how many suits are likely to be brought against the company. Next, the portfolio distribution over various class codes (C) is included. A portfolio offers more coverage as it is better spread over various class codes. A portfolio focused on a few class codes will leave the company with a higher exposure than a portfolio that spans several class codes. The higher the concentration in a class code, the higher the overall exposure. These factors are then divided by the strength of the company's patent portfolio, as determined by the number of U.S. patents, the number of U.S. patent applications, and the number of assets licensed from third parties, as a larger amount of patents will yield a lower exposure (note that since this is based on a statistical distribution, there is no measure of the quality of the portfolio other than taking into account its concentration). In a current example PIRAST, different weights are applied to these various assets: the weighted sum of the patents owned by the company is attributed a weight of 1, the number of applications submitted is attributed a weight ⅓, as some of the applications will be denied or abandoned, and the number of licensed patents is attributed a weight ½ as they do not have the exclusivity aspect of an owned patent. Other weighting schemes may be similarly incorporated.

Figure 13:
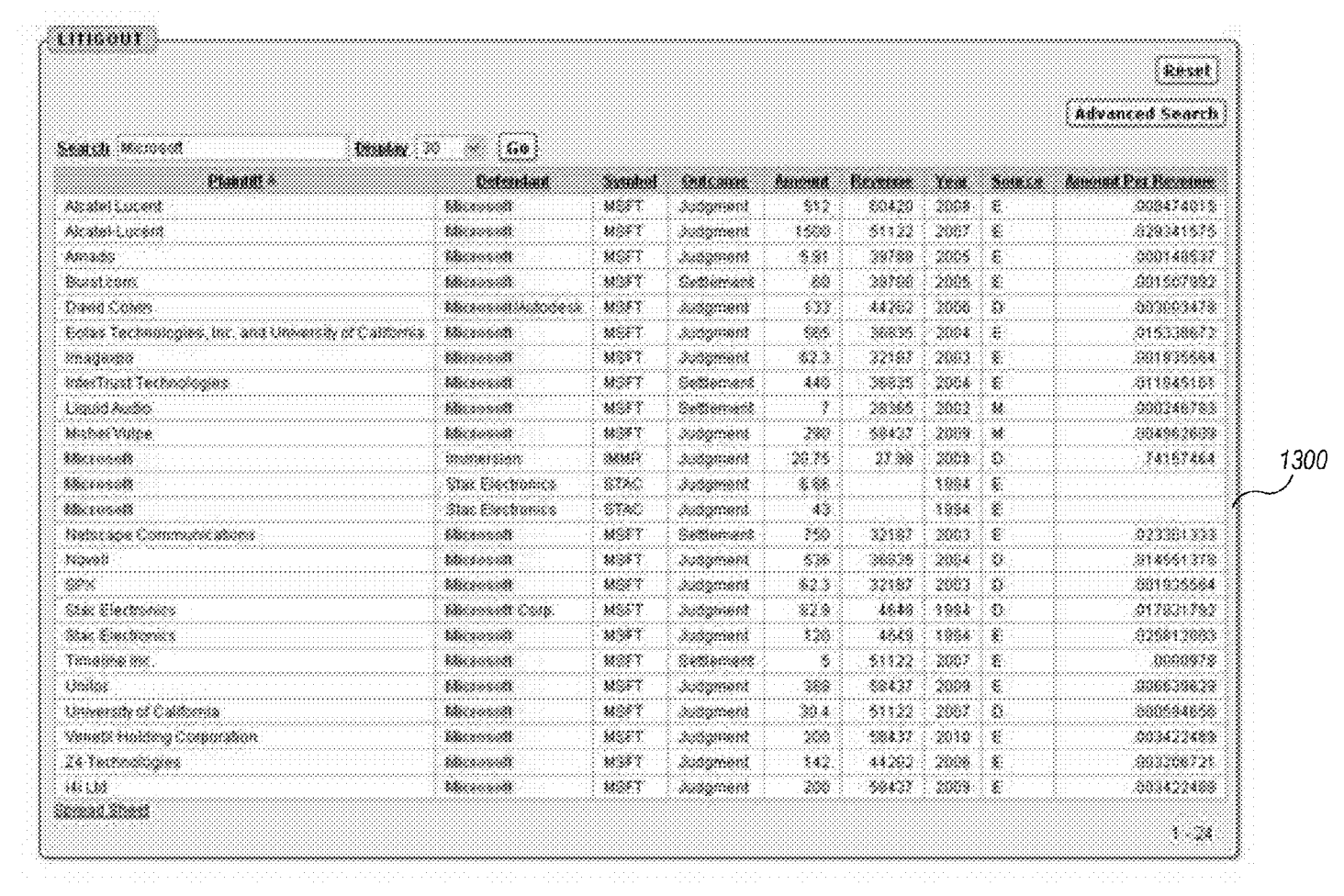
Figure 14:
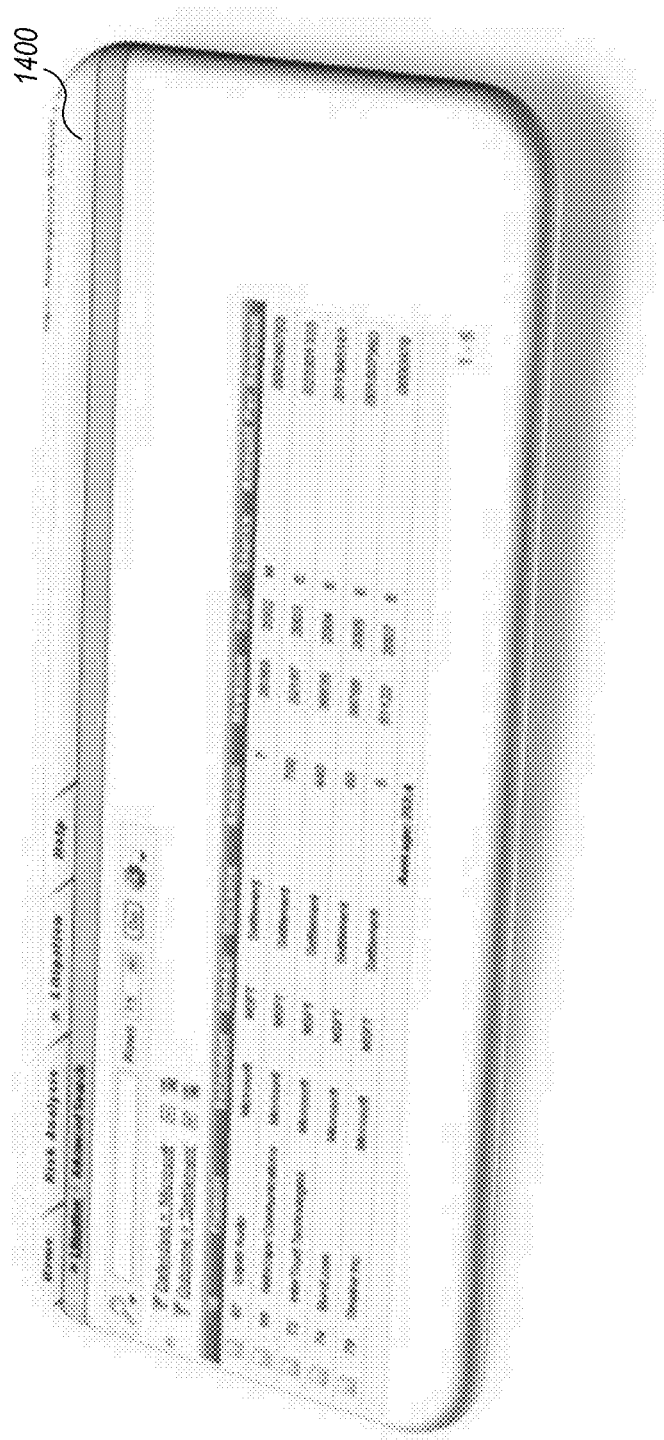
FIG. 14 illustrates an example advanced search and reporting capability of an example Patent Infringement Risk Assessment Tool.

FIG. 13 illustrates an example interface to access the underlying data of an example analysis. Search interface 1300 allows a user to enter a search term through a standard single field search interface. FIG. 14 illustrates an example advanced search and reporting capability of an example Patent Infringement Risk Assessment Tool.

Also, although the examples described herein refer to use by a company to assess and mitigate exposure to patent litigation, the concepts and techniques described herein are applicable to other scenarios in which obtaining a sense of patent litigation exposure may be helpful. For example, the concepts and techniques described may be used by a company in a due diligence activities when acquiring another company.

Also, although certain terms are used primarily herein, other terms could be used interchangeably to yield equivalent embodiments and examples. In addition, terms may have alternate spellings which may or may not be explicitly mentioned, and all such variations of terms are intended to be included.

Example described herein provide applications, tools, data structures and other support to implement a Patent Infringement Risk Assessment Tool. Other embodiments of the described techniques may be used for other purposes, including for creating other applications and other tools, whether web-based, monolithic applications, etc. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 15:
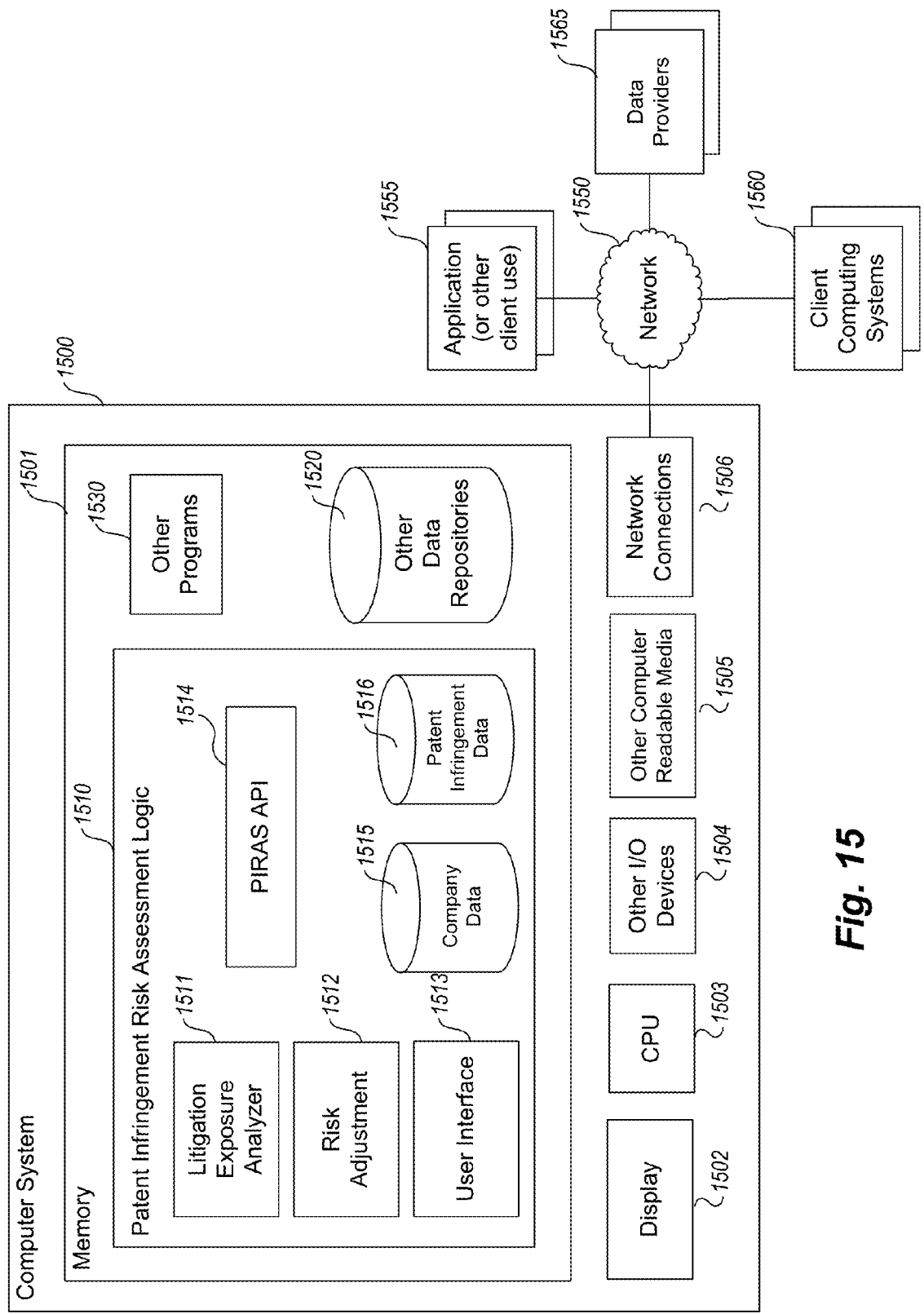
FIG. 15 is an example block diagram of an example computing system that may be used to practice example Patent Infringement Risk Assessment tools, applications, and/or logic as described herein.

FIG. 15 is an example block diagram of an example computing system that may be used to practice example Patent Infringement Risk Assessment tools, applications, and/or logic as described herein. Note that a general purpose or a special purpose computing system suitably instructed may be used. Further, the Patent Infringement Risk Assessment logic may be implemented in software, hardware, firmware, or in some combination to achieve the capabilities described herein.

The computing system 1500 may comprise one or more server and/or client computing systems and may span distributed locations. In addition, each block shown may represent one or more such blocks as appropriate to a specific embodiment or may be combined with other blocks. Moreover, the various blocks of the Patent Infringement Risk Assessment logic 1510 may physically reside on one or more machines, which use standard (e.g., TCP/IP) or proprietary interprocess communication mechanisms to communicate with each other.

In the example shown, computer system 1500 comprises a computer memory ("memory") 1501, a display 1502, one or more Central Processing Units ("CPU") 1503, Input/Output devices 1504 (e.g., keyboard, mouse, CRT or LCD display, etc.), other computer-readable media 1505, and one or more network connections 1506. The Patent Infringement Risk Assessment logic 1510 is shown residing in memory 1501. In other embodiments, some portion of the contents, some of, or all of the components of the Patent Infringement Risk Assessment logic 1510 may be stored on and/or transmitted over the other computer-readable media 1505. The components of the Patent Infringement Risk Assessment logic 1510 preferably execute on one or more CPUs 1503 and manage the application of the methodologies as described herein. Other code or programs 1530 and potentially other data repositories, such as data repository 1520, also reside in the memory 1501, and preferably execute on one or more CPUs 1503. Of note, one or more of the components in FIG. 15 may not be present in any specific implementation. For example, some embodiments embedded in other software may not provide means for user input or display.

In a typical embodiment, the Patent Infringement Risk Assessment logic 1510 includes at least one litigation exposure analyzer 1511, at least one risk adjustment logic 1512, potentially a user interface 1513, data on the various companies as stored in data repository 1515 and patent infringement statistical data 1514. The litigation exposure analyzer 1511 may be used, for example, to compute the risk per litigation (Table 2) as well as the annual risk exposure. The risk adjustment logic 1512 may be used to compute the adjustment factors for a particular company. The user interface 1513 may provide, for example, an interface similar to the Web SaaS tool described with reference to FIGS. 10-14.

In at least some embodiments, the company data 1515 is provided external to the Patent Infringement Risk Assessment logic 1510 and is available, potentially, over one or more networks 1550. Other and/or different modules (components, logic, etc.) may be implemented. In addition, the Patent Infringement Risk Assessment logic 1510 may interact via a network 1550 with application or client code 1555 that, for example, uses results computed by the Patent Infringement Risk Assessment logic 1510, one or more client computing systems 1560 for interfacing for example to a PIRAST application, and/or one or more third-party information provider systems 1565, such as purveyors of information used in company data repository 1515. Also, of note, the patent infringement data 1516 may be provided external to the Patent Infringement Risk Assessment logic 1510 as well, for example in a knowledge base accessible over one or more networks 1550.

In one example, components/modules of the Patent Infringement Risk Assessment logic 1510 are implemented using standard programming techniques. However, a range of programming languages known in the art may be employed for implementing such examples, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The examples described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some examples are illustrated as executing concurrently and asynchronously and communicating using message passing techniques. Equivalent synchronous examples are also supported by an Patent Infringement Risk Assessment logic.

In addition, programming interfaces to the data stored as part of the Patent Infringement Risk Assessment logic 1510 (e.g., in the data repositories 1515 and 1516) can be available by standard means such as through C, C++, C#, and Java APIs; libraries for accessing files, databases, or other data repositories; through scripting languages such as XML; or through Web servers, FTP servers, or other types of servers providing access to stored data. The data repositories 1515 and 1516 may be implemented as one or more database systems, file systems, or any other method known in the art for storing such information, or any combination of the above, including implementation using distributed computing techniques.

Also the example Patent Infringement Risk Assessment logic 1510 may be implemented in a distributed environment comprising multiple, even heterogeneous, computer systems and networks. For example, in one example, several modules are all located in physically different computer systems. In another example, various modules of the Patent Infringement Risk Assessment logic 1510 are hosted each on a separate server (physical or virtual) machine and may be remotely located from the tables which are stored in the data repositories 1515 and 1516. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated examples in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of the Patent Infringement Risk Assessment logic.

Furthermore, in some examples, some or all of the components of the Patent Infringement Risk Assessment logic may be implemented or provided in other manners, such as at least partially in firmware and/or hardware, including, but not limited to one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the components and/or data structures may be stored on tangible storage mediums. Some or all of the system components and data structures may also be transmitted in a non-transitory manner via generated data signals (e.g., as part of a carrier wave or other analog or digital propagated signal) on a variety of computer-readable transmission mediums, such as media 1505, including wireless-based and wired/cable-based mediums, and may take a variety of forms (e.g., as part of a single or multiplexed analog signal, or as multiple discrete digital packets or frames). Such computer program products may also take other forms in other examples. Accordingly, examples of this disclosure may be practiced with other computer system configurations.

As described with reference to FIGS. 10-14, one of the functions of a Patent Infringement Risk Assessment tool is to compute an adjusted risk exposure for a company, for example, so that a risk meter may be provided.

Figure 16:
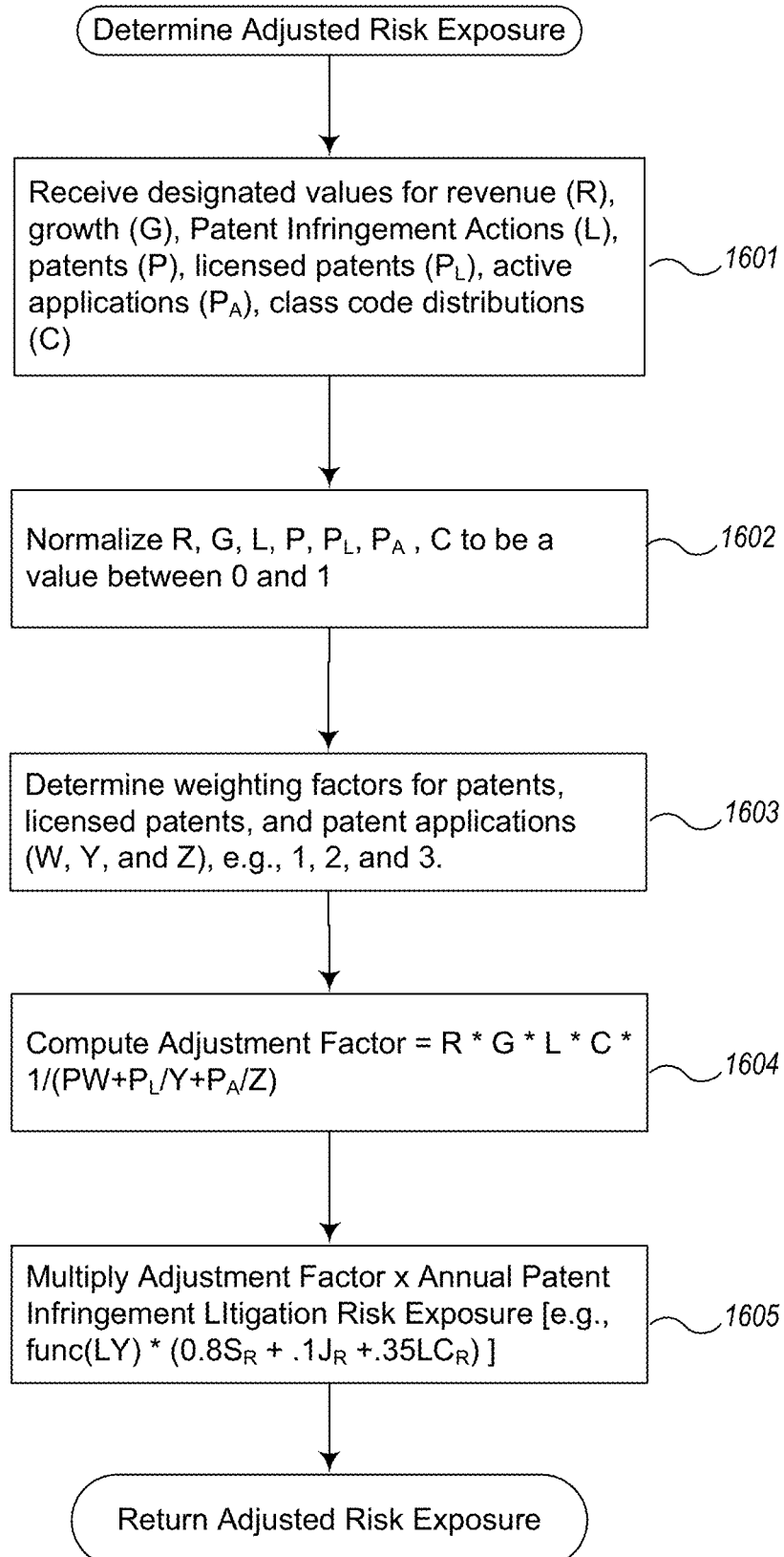
FIG. 16 is an example block diagram of example logic for providing an adjusted annual risk exposure value.

FIG. 16 is an example block diagram of example logic for providing an adjusted annual risk exposure value. This logic may be implemented, for example, by the litigation exposure analyzer 1511 in conjunction with the risk adjuster 1512 in FIG. 15. As described with reference to FIG. 12 (the risk meter), in block 1601, the logic receives values for a plurality of variables including for example: revenue, growth, the average number of patent infringement actions (per year), number of licensed patents, number of patents, number of active applications, and some measure of class code distribution. In one example embodiment, the measure of class code distribution used is an indication of how far the $3^{rd}$ class code (or last filled in class code) is below a 20% measurement for that class code (e.g., where 20% is the maximum number of patents referring to that class code). Other measurements of class code distribution may be incorporated. In block 1602, these numbers are normalized to values between 0 and 1 using the maximum and minimum values for all companies. In block 1603, the logic determines what weighting factors to use for the patents, licensed patents, and active applications as described earlier. In block 1604, the logic computes the adjustment factor using equation (7), as shown in the figure. In block 1605, the logic multiplies this adjustment factor (a number between 0 and 1) by the annual patent infringement risk exposure, which is a function of the number of litigations per year times the exposure for each litigation expressed as a function of revenue. The logic then returns the adjusted risk exposure determined in block 1605 so that, for example, it may be presented using a risk meter or using another user interface or API.

REFERENCES

The following references provide background and/or auxiliary information regarding some of the topics described herein, and are incorporated by reference in their entireties to that extent.
1. Isumo Bergmann, Evaluating the Risk of Patent Infringement by Means of Semantic Patent Analysis: The Case of DNA Chips, R&D Management, Vol. 38, Issue 5, 550 (2008).
2. James E. Bessen, *The Private Cost of Patent Litigation*, Boston University School of Law Working Paper No. 07-08 (2008).
3. Bryan W. Butler, *Patent Infringement: Compensation and Damages* (Law Journal Press 2006)
4. Claude Crampes, *Litigation and Settlement in Patent Infringement Case*, RAND Journal of Economics, Vol. 33, No. 2 (2002).
5. Alberto Galasso, Patent Thickets and the Market for Innovation: Evidence from Settlement of Patent Disputes, CEPR Discussion Paper No. DP6946 (2008).
6. Herbert J. Hovenkamp, *Anticompetitive Settlement of Intellectual Property Disputes*, Min. L. Rev., Vol. 87, p. 1719 (2003).
7. Richard A. Kamprath, Gaming the Patent System: An Empirical Analysis of Litigation Economics and Possible Solutions, July 2010.
8. Jay P. Kesan, How are Patent Cases Resolved? An Empirical Examination of the Adjudicating and Settlement of Patent Disputes, Wa. U. L. Rev. 237 (2006).
9. David W. Opderbeck, *Patent Damages Reform and the Shape of Patent Law*, Seton Hall Public Law and Legal Theory Research Paper No. 1213160 (2008).
10. Fiona Rotstein, *Filing and Settlement of Patent Disputes in the Federal Court*, U. of Melbourne Legal Studies Research Paper No. 226 (2007).
11. Patent Litigation Cost, http://www.inventionstatistics.com/patent_litigation_costs.html.
12. Patent Litigation Trends and the Increasing Impact of Nonpracticing Entities, PricewaterhouseCoopers, August 2009.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/381,379, entitled "CALCULATING THE EXPOSURE OF A COMPANY BASED ON THE INDUSTRY LITIGATION RECORDS AND INFERRING THE BEHAVIOR OF A POPULATION BASED ON THE BEHAVIOR OF A SUBSET," filed Sep. 10, 2010, is incorporated herein by reference, in its entirety.

From the foregoing it will be appreciated that, although specific examples have been described herein for purposes of illustration, various modifications may be made without deviating from the spirit and scope of the invention. For example, the methods and systems for performing patent infringement risk assessment discussed herein are applicable to other architectures other than a Web SaaS architecture. Also, the methods and systems discussed herein are applicable to differing protocols, communication media (optical, wireless, cable, etc.) and devices (such as wireless handsets, electronic organizers, personal digital assistants, tablets, portable email machines, game machines, pagers, navigation devices such as GPS receivers, etc.).

The invention claimed is:

1. A method in a computing system for determining patent infringement risk exposure for a company, comprising:
    under control of the computing system,
        electronically receiving an indication of a revenue of the company;
        electronically determining and storing an estimate for settlement costs of a litigation based upon the received indication of the revenue of the company;
        electronically determining and storing an estimate for judgment costs for the litigation based upon the received indication of the revenue of the company;
        electronically determining and storing an estimate for litigation costs for the litigation based upon the received indication of the revenue of the company;
        electronically combining the stored estimate for settlement costs, the stored estimate for judgment costs, and the stored estimate for litigation costs into a payoff value for the litigation, wherein the electronically combining the stored estimate for settlement costs, the stored estimate for judgment costs, and the stored estimate for litigation costs into a payoff value for the litigation further comprises combining the stored estimate for settlement costs (S1), the stored estimate for judgment costs (J1), and the stored estimate for litigation costs (LC) into a payoff value as a function of the revenue of the company; and
        forwarding the payoff value as the risk exposure for the company.

2. The method of claim 1 wherein the computing system is a server computing system.

3. The method of claim 1 wherein the forwarding the payoff value further comprises:
    forwarding the payoff value to a computer based tool for presenting risk exposure from patent infringement litigation.

4. The method of claim 3 wherein the computer based tool is an electronically displayed risk meter.

5. The method of claim 1 wherein the electronically combining the stored estimate for settlement costs, the stored estimate for judgment costs, and the stored estimate for litigation costs into a payoff value for the litigation further comprises:
    combining the stored estimate for settlement costs (S1), the stored estimate for judgment costs (J1), and the stored estimate for litigation costs (LC) into a payoff value using an equation of: payoff=0.8S1+0.1J1+0.35LC.

6. The method of claim 1 wherein the electronically combining the stored estimate for settlement costs, the stored estimate for judgment costs, and the stored estimate for litigation costs into a payoff value for the litigation further comprises:
    combining the stored estimate for settlement costs (S1), the stored estimate for judgment costs (J1), and the stored estimate for litigation costs (LC) into a payoff value using an equation of: payoff=k1*S1+k2*J1+k3*LC, wherein the k1, k2, and k3 are constant values.

7. The method of claim 6 wherein the k1, k2, and k3 constant values are determined from data examined relative to a litigation tree.

8. The method of claim 1 wherein the electronically determined estimate for settlement costs (S1), estimate for judgment costs (J1), and estimate for litigation costs (LC) are expressed using revenue values.

9. The method of claim 8 wherein the revenue values for the settlement costs (S1) are calculated as $0.185 \text{ Revenue}^{0.545}$.

10. The method of claim 8 wherein the revenue values for the settlement costs (S1) are calculated as $k4*Revenue^{k5}$, wherein k4 and k5 are constant values determined from a best fit of industry settlement cost data as a function of revenue.

11. The method of claim 10 wherein the $k4*Revenue^{k5}$ formula is based upon grouping the industry settlement cost data into multiple buckets of different sizes of revenue.

12. The method of claim 11 wherein the groupings into multiple buckets increases the $R^2$ correlation between settlement cost and revenue.

13. The method of claim 11 wherein the groupings comprised four groupings.

14. The method of claim 8 wherein the revenue values for the judgment costs (J1) are calculated as $01.0232\, Revenue^{0.5}$.

15. The method of claim 8 wherein the revenue values for the judgment costs (J1) are calculated as $k6*Revenue^{k7}$, wherein k6 and k7 are constant values determined from a best fit of industry judgment cost data as a function of revenue.

16. The method of claim 15 wherein the $k6*Revenue^{k7}$ formula is based upon grouping the industry judgment cost data into multiple buckets of different sizes of revenue.

17. The method of claim 16 wherein the groupings into multiple buckets increases the $R^2$ correlation between judgment cost and revenue.

18. The method of claim 16 wherein the groupings comprised four groupings.

19. The method of claim 8 wherein the revenue values for the litigation costs are calculated as $0.1678\, Revenue^{0.388}$.

20. The method of claim 8 wherein the revenue values for the litigation costs (LC) are calculated as $k8*Revenue^{k9}$, wherein k8 and k9 are constant values determined from a best fit of industry litigation cost data as a function of revenue.

21. The method of claim 1, further comprising:
electronically receiving an indication of a number of litigations per year for the company;
determining a risk multiplier by determining a value for a function of the received indication of the number of litigations per year; and
multiplying the payoff value by the risk multiplier to obtain a measurement of annual risk exposure for the company from patent infringement litigation.

22. The method of claim 21, further comprising:
electronically determining one or more factors that can increase or decrease risk from patent infringement litigation for the company; and
adjusting the annual risk exposure for the company by the determined one or more factors.

23. The method of claim 22 wherein the determined one or more factors include a company growth rate (G) and/or annual revenue (R).

24. The method of claim 22 wherein the determined one or more factors include one or more of a number of patents held by the company (P), a number of patents licensed to the company ($P_L$), and/or a number of patent applications held by the company ($P_A$).

25. The method of claim 22 wherein the determined one or more factors include a measure of distribution across subject matter categories of patents associated with the company C.

26. The method of claim 22 wherein each of the determined one or more factors are normalized before adjusting the annual risk exposure.

27. The method of claim 22, further comprising:
combining the determined one or more factors into an adjustment according to the equation: $R*G*L*C*1/(P+P_L/c1+P_A/c2)$, where each of the terms is a normalized value, wherein c1 and c2 are constant values; and
adjusting the annual risk exposure for the company by multiplying the annual risk exposure by the adjustment.

28. The method of claim 27 wherein c1=2 and c2=3.

29. An electronic risk exposure measurement tool for determining patent infringement risk exposure for a company, comprising:
an input module for receiving an indication of a revenue of the company;
litigation exposure logic, stored in a computer memory, and that is configured, when executed on a computer processor to:
determine and store an estimate for settlement costs of a litigation based upon the received indication of the revenue of the company;
determine and store an estimate for judgment costs for the litigation based upon the received indication of the revenue of the company;
determine and store an estimate for litigation costs for the litigation based upon the received indication of the revenue of the company;
combine the stored estimate for settlement costs, the stored estimate for judgment costs, and the stored estimate for litigation costs into an estimated exposure for the litigation, wherein the litigation exposure logic is configured to combine the stored estimate for settlement costs (S1), the stored estimate for judgment costs (J1), and the stored estimate for litigation costs (LC) into an estimated exposure as a function of the revenue of the company; and
communication logic, communicably coupled to the litigation exposure logic, that is configured when executed to receive the estimated exposure for the litigation and forward the estimated exposure value for the company.

30. The tool of claim 29 wherein the tool is executed on a server computing system.

31. The tool of claim 29 wherein the communication logic forwards the estimated exposure value to a client side application for presentation.

32. The tool of claim 29 wherein the tool provides an electronically displayed risk meter.

33. The tool of claim 29 wherein the litigation exposure logic is further configured to:
combine the stored estimate for settlement costs (S1), the stored estimate for judgment costs (J1), and the stored estimate for litigation costs (LC) into an estimated exposure using an equation of: exposure=0.8S1+0.1J1+0.35LC.

34. The tool of claim 29 wherein the litigation exposure logic is further configured to:
combine the stored estimate for settlement costs (S1), the stored estimate for judgment costs (J1), and the stored estimate for litigation costs (LC) into an estimated exposure using an equation of: exposure=k1*S1+k2*J1+k3*LC, wherein the k1, k2, and k3 are constant values.

35. The tool of claim 29 wherein the k1, k2, and k3 constant values are determined from a litigation tree.

36. The tool of claim 29 wherein the litigation exposure logic is further configured to:
receive the electronically determined estimate for settlement costs (S1), estimate for judgment costs (J1), and estimate for litigation costs (LC) as revenue values.

37. The tool of claim 36 wherein the revenue values for the settlement costs (S1) are calculated as $0.185\, Revenue^{0.545}$.

38. The tool of claim 36 wherein the revenue values for the settlement costs (S1) are calculated as $k4*Revenue^{k5}$, wherein k4 and k5 are constant values determined from a best fit of industry settlement cost data as a function of revenue.

39. The tool of claim 38 wherein the $k4*Revenue^{k5}$ formula is based upon grouping the industry settlement cost data into multiple buckets of different sizes of revenue.

40. The tool of claim 39 wherein the groupings into multiple buckets increase the $R^2$ correlation between settlement cost and revenue.

41. The tool of claim 39 wherein the groupings comprised four groupings.

42. The tool of claim 36 wherein the revenue values for the judgment costs (J1) are calculated as $01.0232\ Revenue^{0.5}$.

43. The tool of claim 36 wherein the revenue values for the judgment costs (J1) are calculated as $k6*Revenue^{k7}$, wherein k6 and k7 are constant values determined from a best fit of industry judgment cost data as a function of revenue.

44. The tool of claim 43 wherein the $k6*Revenue^{k7}$ formula is based upon grouping the industry judgment cost data into multiple buckets of different sizes of revenue.

45. The tool of claim 44 wherein the groupings into multiple buckets increases the $R^2$ correlation between judgment cost and revenue.

46. The tool of claim 44 wherein the groupings comprised four groupings.

47. The tool of claim 36 wherein the revenue values for the litigation costs are calculated as $0.1678\ Revenue^{0.388}$.

48. The tool of claim 29 wherein the litigation exposure logic is further configured to:
   receive an indication of a number of litigations per year for the company;
   determine a risk multiplier by determining a value for a function of the received indication of the number of litigations per year; and
   multiply the estimated exposure by the risk multiplier to obtain a measurement of annual risk exposure for the company from patent infringement litigation.

49. The tool of claim 48, wherein the litigation exposure logic is further configured to:
   determine one or more factors that can increase or decrease risk from patent infringement litigation for the company; and
   adjust the annual risk exposure for the company by the determined one or more factors.

50. The tool of claim 48 wherein the determined one or more factors include a company growth rate (G) and/or annual revenue (R).

51. The tool of claim 48 wherein the determined one or more factors include one or more of a number of patents held by the company (P), a number of patents licensed to the company ($P_L$), and/or a number of patent applications held by the company ($P_A$).

52. The tool of claim 48 wherein the determined one or more factors include a measure of distribution across subject matter categories of patents associated with the company C.

53. The tool of claim 48 wherein each of the determined one or more factors are normalized before adjusting the annual risk exposure.

54. The tool of claim 48 wherein the litigation exposure logic is further configured to:
   combine the determined one or more factors into an adjustment according to the equation: $R*G*L*C*1/(P+P_L/c1+P_A/c2)$, where each of the terms is a normalized value between 0 and 1, and wherein c1 and c2 are constant values; and
   adjust the annual risk exposure for the company by multiplying the annual risk exposure by the adjustment.

55. The tool of claim 54 wherein c1=2 and c2=3.

\* \* \* \* \*